(12) United States Patent
Sharma et al.

(10) Patent No.: US 11,888,994 B1
(45) Date of Patent: Jan. 30, 2024

(54) AUTOMATED DETERMINATION OF TEMPLATE PUBLIC KEY INFRASTRUCTURE SYSTEMS

(71) Applicant: Amazon Technologies, Inc., Seattle, WA (US)

(72) Inventors: Param Sharma, Haymarket, VA (US); Josh Rosenthol, Centreville, VA (US); Todd Cignetti, Ashburn, VA (US); Jonathan Kozolchyk, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 240 days.

(21) Appl. No.: 17/364,232

(22) Filed: Jun. 30, 2021

(51) Int. Cl.
*H04L 9/32* (2006.01)
*H04L 9/08* (2006.01)

(52) U.S. Cl.
CPC .......... *H04L 9/3263* (2013.01); *H04L 9/0825* (2013.01); *H04L 9/0836* (2013.01); *H04L 9/0891* (2013.01)

(58) Field of Classification Search
CPC ... H04L 9/3263; H04L 9/0825; H04L 9/0836; H04L 9/0891
See application file for complete search history.

(56) References Cited

U.S. PATENT DOCUMENTS

| | | | |
|---|---|---|---|
| 6,108,788 A * | 8/2000 | Moses .................. | G06F 21/602 713/155 |
| 7,949,771 B1 * | 5/2011 | Chen .................. | H04L 63/0823 713/168 |
| 8,856,527 B1 * | 10/2014 | Schwengler ............ | H04L 63/00 713/168 |
| 9,100,190 B1 * | 8/2015 | Schwengler ............ | H04L 63/00 |
| 2010/0138907 A1 * | 6/2010 | Grajek ................ | H04L 63/0823 709/217 |
| 2011/0087881 A1 * | 4/2011 | Howcroft .............. | H04L 9/3263 713/156 |
| 2011/0145569 A1 * | 6/2011 | Liu ....................... | H04L 9/0891 713/158 |
| 2011/0153479 A1 * | 6/2011 | Liu ........................ | G06Q 30/04 705/34 |
| 2011/0213961 A1 * | 9/2011 | Wnuk ................... | H04L 63/062 713/156 |
| 2016/0142215 A1 * | 5/2016 | Kruegel ................ | H04L 9/3263 713/158 |
| 2018/0062855 A1 * | 3/2018 | Bracken .................... | H04L 9/14 |
| 2020/0250661 A1 * | 8/2020 | Padmanabhan .... | G06Q 20/3827 |

* cited by examiner

*Primary Examiner* — Darshan I Dhruv
(74) *Attorney, Agent, or Firm* — Athorus, PLLC

(57) ABSTRACT

Described are automated systems and methods for providing a template design for a public-key infrastructure (PKI) system. For example, certain infrastructure information and stored PKI information can be processed to determine a PKI template, which can specify the configuration for a proposed PKI hierarchy. A configurable representation of the proposed PKI hierarchy can be generated and presented to the user, which can facilitate review, modification, and further customization of the proposed PKI hierarchy. Aspects of the present disclosure can also determine costs associated with the proposed PKI hierarchy, and can create and deploy the proposed PKI hierarchy.

20 Claims, 15 Drawing Sheets

AUTOMATED DETERMINATION OF TEMPLATE PUBLIC KEY INFRASTRUCTURE SYSTEMS

BACKGROUND

With the proliferation of network-based services, confirming identity and securing transmission of electronic information can be critical. A public-key infrastructure (PKI) hierarchy can provide digital identity and enable secure transmission of electronic information. A PKI hierarchy typically relies on certificates (e.g., X.509 certificates) issued by one or more certificate authorities (CAs) to create a pyramid of trust, where all certificates issued by subordinate CAs are automatically trusted because the first or root CA is trusted. However, designing PKI hierarchies can be complex and many organizations may not have the requisite knowledge to design and deploy a PKI hierarchy. Based on the needs of an organization, a PKI hierarchy may employ various different CA hierarchies, certificate signing algorithms, public-private key generation algorithms, access and/or management configurations, CA and certificate lifecycles, certificate revocations, and the like. Accordingly, designing and deploying a PKI hierarchy can be difficult.

BRIEF DESCRIPTION OF DRAWINGS

The detailed description is described with reference to the accompanying figures.

DETAILED DESCRIPTION

Figure 1A:
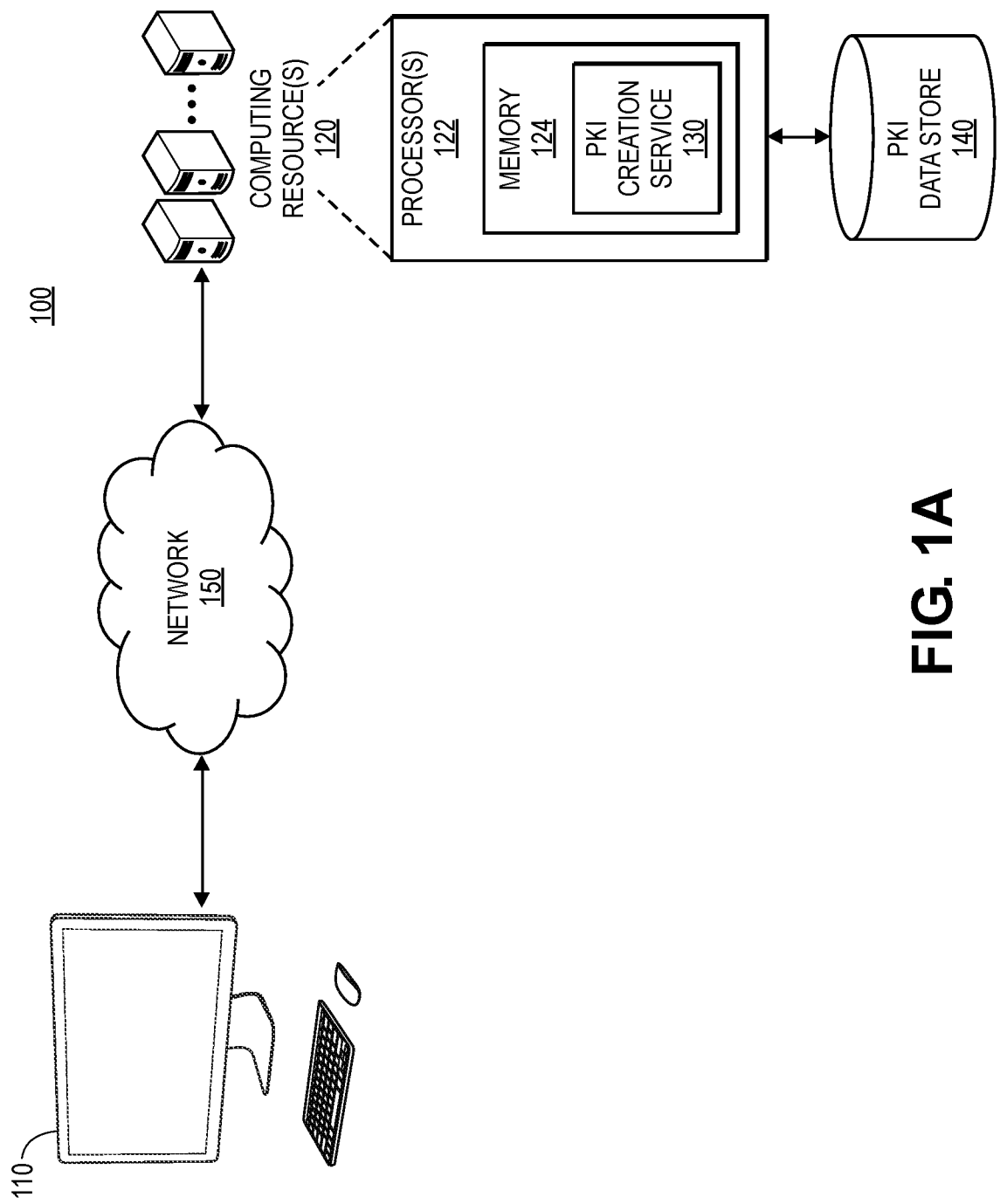
FIGS. 1A and 1B are block diagram illustrations of exemplary computing environments, according to exemplary embodiments of the present disclosure.

As set forth in greater detail below, embodiments of the present disclosure can provide automated systems and methods for providing a template design for a public-key infrastructure (PKI) hierarchy. Embodiments of the present disclosure can obtain certain information (e.g., from a client device) regarding the system(s) and/or organization for which a PKI hierarchy is to be deployed and automatically provide a recommended custom PKI template based on the provided information. The recommended custom PKI template may specify certain parameters of a PKI hierarchy, such as a certificate authority (CA) hierarchy, CA roles, CA and certificate lifecycles, certificate templates, certificate revocation and/or online certificate status protocol (OCSP), certificate distribution, security configurations, certificates issued to end entities, and the like. A configurable representation of the recommended custom PKI template may be generated and presented on the client device, which can facilitate review, modification, and/or deployment of the PKI hierarchy defined by the custom PKI template. Accordingly, embodiments of the present disclosure can be provided within a broader cloud computing service or a software as a service (SaaS) private CA service and can advantageously facilitate the efficient design, customization, and deployment of a PKI hierarchy without requiring knowledge and/or experience in the design and deployment of PKI hierarchies.

According to embodiments of the present disclosure, information regarding the system(s) and/or organization for which the PKI hierarchy is to be deployed may be obtained via a user interface presented on a client device. The user interface can include a wizard-type application presenting one or more questions and/or requests for information that may define certain parameters associated with the system(s), infrastructure, and/or organization. For example, embodiments of the present disclosure may obtain information regarding the purpose of the system(s) for which the PKI hierarchy is being designed and deployed, the end users of the system(s), the organization(s) that will be managing the PKI hierarchy, a usage model associated with the PKI hierarchy, and the like. This information may be processed and analyzed to generate a custom PKI template based on the obtained information. For example, the custom PKI template may be determined based on the provided information, best practices, PKI hierarchy history, etc. According to certain embodiments of the present disclosure, the provided information may be provided as an input to a trained machine learning model, which may determine the custom PKI template to be provided. A configurable representation of the custom PKI template may be generated and presented to a user, who can further review and/or customize the configuration presented by the custom PKI template. After customization is completed, the PKI hierarchy in accordance with the custom PKI template can be prepared for deployment.

Embodiments of the present disclosure can also facilitate analysis and customization of an existing PKI hierarchy. For example, embodiments of the present disclosure can analyze an existing PKI hierarchy to facilitate viewing, review, and customization of the existing PKI hierarchy. The CAs, certificates, etc. of the existing PKI hierarchy can be analyzed to determine a CA hierarchy, CA roles, CA and certificate lifecycles, certificate revocation and/or online certificate status protocol (OCSP), security configurations, certificates issued to end entities, and the like of the existing PKI hierarchy. This information may then be used to generate and present a configurable representation of the existing PKI hierarchy, which can be viewed, reviewed, modified, and/or deployed. Optionally, the wizard-type application used to obtain information regarding the system(s) and/or organization for which the existing PKI hierarchy is being used may also be presented in conjunction with the configurable representation of the existing PKI hierarchy. Accordingly, embodiments of the present disclosure can also provide a suggested PKI change template, which may include modifications to the existing PKI hierarchy, based on the information obtained through the application. The suggested PKI change template can be presented along with the configurable representation of the existing PKI hierarchy, such that the PKI hierarchy, along with any suggested modifications, may be reviewed, modified, and/or deployed.

While the exemplary embodiments are described primarily with respect to PKI hierarchies, one of ordinary skill in the art will appreciate that the embodiments of the present disclosure may also be applicable to encryption, authentication, and/or trust model systems such as, for example, a decentralized PKI, blockchain based systems, pretty good privacy systems, trust on first use systems, and the like. The descriptions utilizing PKI hierarchies are exemplary and are not limiting.

Figure 1B:
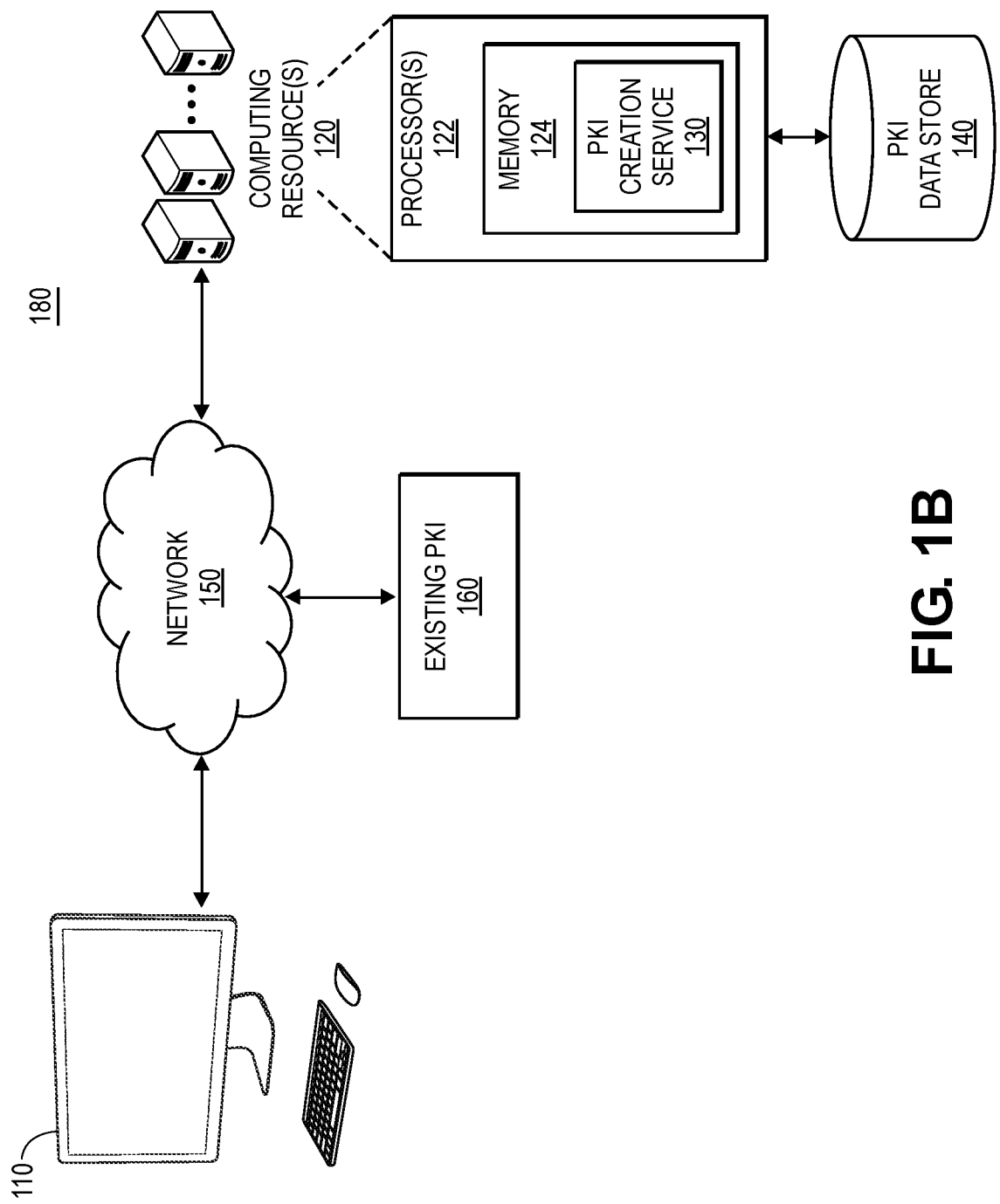

FIGS. 1A and 1B are illustrations of exemplary computing environments 100 and 180, according to exemplary embodiments of the present disclosure.

As shown in FIGS. 1A and 1B, computing environments 100 and 180 may include client device 110 and PKI creation service 130, which may execute on one or more remote computing resources 120. Client device 110 may be any computing device, such as a workstation, desktop or laptop computer, tablet, and the like. According to certain embodiments, client device 110 can include other computing devices and/or systems, such as a cloud computing system, and the like. In the illustrated example, client device 110 can communicate with PKI creation service 130 executing on computing resources 120 through a connection over network 150, such as the Internet, an intranet, wide area network, local area network, direction connection, etc. Further, network 150, and each of the other networks discussed herein, may utilize wired technologies (e.g., wires, USB, fiber optic cable, etc.), wireless technologies (e.g., radio frequency, infrared, near-field-communication (NFC), cellular, satellite, BLUETOOTH, etc.), or other connection technologies. Network 150 is representative of any type of communication network, including data and/or voice network, and may be implemented using wired infrastructure (e.g., cable, CAT5, fiber optic cable, etc.), a wireless infrastructure (e.g., radio frequency, cellular, microwave, satellite, BLUETOOTH, etc.), and/or other connection technologies.

Computing resources 120 illustrated in FIGS. 1A and 1B may include one or more processors 122 and memory 124 storing program instructions, such as PKI creation service 130, which may be executed by one or more processors 122. As illustrated, computing resources 120 may be implemented as one or more servers and may, in some instances, form a portion of a network-accessible computing platform implemented as a computing infrastructure of processors, storage, software, data access, and so forth that is maintained and accessible by client device 110 via network 150.

According to embodiments of the present disclosure, PKI creation service 130 may be configured to determine a custom PKI template based on information describing the system(s) and/or organization for which a PKI hierarchy is to be deployed. Initially, PKI creation service 130 may receive a request (e.g., from client device 110) to facilitate the design and deployment of a PKI hierarchy. In response, PKI creation service 130 may obtain (e.g., from client device 110) certain infrastructure information regarding the system(s), infrastructure, and/or organization for which the PKI hierarchy is being designed. For example, PKI creation service 130 may send for presentation on client device 110 a user interface through which the infrastructure information may be obtained. The user interface may include a form, questionnaire, wizard, etc. which may present one or more questions and/or requests for information which may describe the system(s), infrastructure, and/or organization for which the PKI hierarchy is to be deployed. For example, the user interface may ask questions and/or seek infrastructure information such as the purpose(s) and/or use(s) associated with the system for which the PKI hierarchy will be used (e.g., Kubernetes, Microsoft Active Directory, development and test environment, Internet of Things, etc.), what the certificates will be used for (e.g., client certificates, code signing certificates, server certificates, etc.), the users who will be regularly utilizing the PKI hierarchy (e.g., the subject, the relying party, etc.), the accounts, teams, and/or users who will be managing the PKI hierarchy (e.g., a security team, a PKI team, a network administrator, an operations team, etc.), a contemplated usage model of the PKI hierarchy (e.g., CA and/or certificate lifecycles and rotation, certificate revocation, etc.), and the like. According to certain embodiments, the questions and/or requests for information may be presented together via the user interface (e.g., as a single questionnaire type form) and the responses to the questions and/or the requests for information may be obtained at once. Alternatively and/or in addition, the questions and/or requests for information may be dynamically presented in a sequential manner such that one or more initial questions and/or requests for information are first presented, and subsequent questions and/or requests for information are selected and presented via the user interface based on responses obtained to previously presented questions and/or requests for information. Accordingly, responses to the questions and requests for information may be provided, via client device 110, to PKI creation service 130.

Based on the obtained infrastructure information, PKI creation service 130 may determine a custom PKI template that is to be provided. For example, PKI creation service 130 may access a plurality of stored PKI information (e.g., stored in PKI data store 140) in determining the custom PKI template. The stored PKI information may include information regarding the systems for which PKI hierarchies have been deployed, best practices information (e.g., published, learned, etc.) in connection with design parameters/characteristics and/or configurations for PKI hierarchies, information regarding the design and/or configuration of existing PKI hierarchies, feedback information obtained from organizations utilizing deployed PKI hierarchies, corresponding best practices PKI templates for a plurality of different use cases, and the like. Accordingly, PKI creation service 130 may analyze the stored PKI information in view of the obtained system information to determine the custom PKI template, which may include recommended designs, configurations, settings, parameters, etc. for a PKI hierarchy to be deployed. For example, PKI creation service 130 may employ a knowledge-based system, an expert system, collaborative filtering algorithms, content filtering algorithms, a trained machine learning mode (e.g., trained using the stored PKI information and interactions with PKI creation service 130 as training inputs, etc.), other inference-based systems, etc., or any combination thereof to analyze the stored information in view of the obtained system information in determining the custom PKI template. According to embodiments of the present disclosure, the custom PKI template may define the configuration of a PKI hierarchy by specifying one or more of a template CA hierarchy configuration including one or more CAs, CA roles (e.g., creation of identity and access management roles for management and operation of a CA, etc.) for each of the CAs included in the template CA hierarchy configuration, certificate templates to be deployed (certificate templates can specify certificate attributes such as, e.g., certificate signing algorithms, key pair length and key pair generation algorithms, etc.), security configurations (e.g., enabling alarms, logging and reporting security incidents, establishing reporting and access controls, etc.), CA lifecycles (e.g., expiration of CAs, rotation of CAs, etc.), certificate lifecycles (e.g., certificate expiration, certificate rotation, etc. for root certificates, CA certificates and leaf certificates, etc.), certificate and/or CA revocation, certificate distribution, managing trust from the CAs, and the like.

Once a custom PKI template has been determined, PKI creation service 130 may generate a configurable representation of the configuration of a PKI hierarchy defined by custom PKI template and present the configurable representation of the configuration defined by custom PKI template on client device 110. For example, the configurable representation may include a graphical representation of the configuration defined by custom PKI template that may be presented via a graphical user interface on client device 110. The configurable representation of the custom PKI template may include the proposed CAs and the CA hierarchy, descriptions of the CA roles, descriptions of the security configurations, descriptions of the certificate template, description of CA and/or certificate lifecycles, description of CA and/or certificate revocation, and the like. Once presented with the configurable representation of the custom PKI template, a user may, via client device 110, interact with the configurable representation to review, modify, and/or customize the custom PKI template to further configure the custom PKI template to the system and/or organization. For example, a user may modify the number of CAs, change access and/or management of the CAs, add domain constraints to the CAs, and the like. Optionally, any modifications and/or customizations made to the custom PKI template may be received by PKI creation service 130 and processed to determine if other changes should be implemented to the custom PKI template. PKI creation service 130 may analyze the PKI stored information in view of the received modification to determine if further changes to the custom PKI template should be recommended. For example, if the custom PKI template is modified to shorten the lifecycle of a certificate to a relatively short period (e.g., 1 day, 5 days, etc.), PKI creation service 130 may determine that certificate revocation is no longer needed by the custom PKI template. By way of another example, if the custom PKI template is modified from a two-tier CA hierarchy to a single tier CA hierarchy (e.g., removal of subordinate CAs), the certificate template and the certificates issued by the root CA may be modified accordingly.

According to embodiments of the present disclosure, the configurable representation of the custom PKI template may be presented to the user via client device 110 in conjunction with the obtaining of system information. For example, a user may be presented with one or more initial question(s) and/or request(s) for information (e.g., the use case of the system, etc.). Based on the response to the initial request(s) for information and the stored PKI information, PKI creation service 130 may determine an initial custom PKI template. The initial custom PKI template may have at least some of the design, configuration, and settings that may be included in the custom PKI template. For example, PKI creation service 130 may determine an initial custom PKI template including a two-tiered CA hierarchy configuration with a root CA and one or more subordinate issuing CAs for a Kubernetes system and/or a Microsoft Active Directory system but may not include further customizations to the PKI template. Alternatively and/or in addition, PKI creation service 130 may determine an initial custom PKI template having a single issuing root CA for a development and test environment system. A configurable representation (e.g., a graphical representation) of the initial custom PKI template may then be generated and presented, in conjunction with additional questions and/or requests for information, to the user via client device 110. Subsequently, PKI creation service 130 may present additional questions and/or requests for information alongside the configurable representation of the initial custom PKI template and update the configurable representation of the initial custom PKI template as responses to the additional questions and/or requests for information are received. Alternatively and/or in addition, the user may interact with the configurable representation of the initial custom PKI template to review, modify, and/or customize the initial custom PKI template directly (e.g., rather than provide responses to the additional questions and/or requests for information).

After the user has completed review, modification, and/or customization of the configuration of the PKI hierarchy defined by the custom PKI template, the final design of the PKI hierarchy may be presented (e.g., via client device 110) to the user. According to certain aspects of the present disclosure, presentation of the final design of the PKI hierarchy may also include an estimated cost for the PKI hierarchy specified by the custom PKI template. For example, the presentation of the estimated cost may include an itemization of the costs associated with the various components of the PKI hierarchy. Optionally, PKI creation service 130 may provide the user a further opportunity to review, modify, and/or customize the PKI hierarchy in view of the presented cost, and present a modified cost to the user in view of any modifications the user may make to the PKI hierarchy.

After the user has completed the review and/or modifications to the PKI hierarchy (including review of the cost information), PKI creation service 130 can facilitate deployment of the designed PKI hierarchy. For example, PKI creation service 130 can execute or provide a script or template (e.g., command line interface, application programming interface (API) template, cloud formation template, etc.) that can facilitate creation and deployment of the PKI hierarchy. Alternatively and/or in addition, PKI creation service 130 can provide and save a script or template that may be executed at a later time and/or in a different region, etc. to facilitate creation and deployment of the PKI hierarchy.

Embodiments of the present disclosure can also facilitate automated analysis, review, and customization of an existing PKI hierarchy. As shown in FIG. 1B, PKI creation service 130 may be communicatively connected to existing PKI hierarchy 160 through network 150. Accordingly, PKI creation service 130 can be configured to analyze existing PKI hierarchy 160 to determine the design, configuration, settings, etc. associated with existing PKI hierarchy 160. For example, PKI creation service 130 can analyze the CAs and/or the certificates issued by the CAs in existing PKI hierarchy 160 to identify information such as the type of certificates being issued, the keys being used to sign the certificates, the subject of the certificates, the lifecycles of the certificates and/or the CAs, the signing CAs, security settings associated with the CAs, management rights associated with the CAs, the CA hierarchy, etc. The information identified regarding existing PKI hierarchy 160 can be used to generate a configurable representation (e.g., a graphical representation, etc.) of existing PKI hierarchy 160, which may be presented on client device 110.

Similar to the configurable representation of the custom PKI template, the configurable representation of existing PKI hierarchy 160 may include the CA hierarchy, descriptions of the CA roles, descriptions of the security configurations, descriptions of the certificate template, description of CA and/or certificate lifecycles, description of CA and/or certificate revocation, etc. associated with existing PKI hierarchy 160. Once presented with the configurable representation of existing PKI hierarchy 160, a user may, via client device 110, interact with the configurable representation to review, update, modify, and/or customize existing PKI hierarchy 160. For example, a user may modify the number of CAs and/or the CA hierarchy, change access and/or management of the CAs, etc.

According to certain embodiments of the present disclosure, PKI creation service 130 may optionally obtain information in connection with the analysis of existing PKI hierarchy 160 to determine and provide recommended changes to existing PKI hierarchy 160. For example, users may utilize embodiments of the present disclosure to ascertain the design of an existing PKI hierarchy (e.g., existing PKI hierarchy 160) to identify weaknesses in the existing PKI hierarchy, modify the existing PKI hierarchy in anticipation of changing needs and/or use cases, and the like. Accordingly, PKI creation service 130 may present a user interface (e.g., on client device 110) through which information may be obtained. The user interface may include a form, questionnaire, wizard, etc. which may present one or more questions and/or requests for information which may describe the system for which existing PKI hierarchy 160 is being used, changes to the system that are being contemplated, new systems that may utilize existing PKI hierarchy 160, changes to existing PKI hierarchy 160 that are being contemplated, and the like. For example, the user interface may ask questions and/or seek infrastructure information such as the purpose(s) and/or use(s) associated with the system for which existing PKI hierarchy 160 is being used, the purpose(s) and/or use(s) associated with any modifications to the system and/or any new systems, changes to the teams and/or users who will be managing existing PKI hierarchy 160, changes to the usage model of existing PKI hierarchy 160, and the like. The user interface through which the information is obtained may be presented prior to or in conjunction with the presentation of the configurable representation of existing PKI hierarchy 160.

Accordingly, based on the responses to the questions and requests for information, PKI creation service 130 may propose certain changes to existing PKI hierarchy 160. For example, based on the obtained information and the plurality of stored PKI information (e.g., stored in PKI data store 140), PKI creation service 130 may determine a PKI change template. Similar to determination of the custom PKI template, the stored PKI information may include information regarding the systems for which PKI hierarchies have been deployed, best practices information (e.g., published, learned, etc.) in connection with design parameters/characteristics and/or configurations for PKI hierarchies, information regarding the design and/or configuration of existing PKI hierarchies, feedback information obtained from organizations utilizing deployed PKI hierarchies, corresponding best practices PKI templates for a plurality of different use cases, and the like. Accordingly, PKI creation service 130 may analyze the stored PKI information in view of the obtained information to determine recommended changes to existing PKI hierarchy 160. For example, PKI creation service 130 may employ a knowledge-based system, an expert system, collaborative filtering algorithms, content filtering algorithms, a trained machine learning model, etc., or any combination thereof to analyze the stored information in view of the obtained system information in determining the PKI change template. According to embodiments of the present disclosure, the PKI change template may specify one or more changes to the CA hierarchy configuration, CA roles (e.g., creation of identity and access management roles for management and operation of a CA, etc.) for each of the CAs, certificate templates to be deployed (certificate templates can specify certificate attributes such as, e.g., certificate signing algorithms, key pair length and key pair generation algorithms, etc.), security configurations (e.g., enabling alarms, logging and reporting security incidents, establishing reporting and access controls, etc.), CA lifecycles (e.g., expiration of CAs, rotation of CAs, etc.), certificate lifecycles (e.g., certificate expiration, certificate rotation, etc.), certificate and/or CA revocation, certificate distribution, managing trust from the CAs, trust store management configurations (e.g., how trust is pushed out from the CAs to the end users, etc.), etc. associated with existing PKI hierarchy 160.

Additionally, PKI creation service 130 can generate a configurable representation (e.g., graphical representation, etc.) of the PKI change template, which can be presented alongside the configurable representation of existing PKI hierarchy 160 such that the user may consider, review, and assess a final design of a PKI hierarchy incorporating the proposed changes to existing PKI hierarchy 160 presented in the PKI change template. For example, the proposed changes specified in PKI change template may be overlayed onto the configurable representation of existing PKI hierarchy 160 with an indication (e.g., dashed lines, highlighting, grayed out coloring, side-by-side comparison with and without the proposed changes, etc.) identifying the proposed changes. Once presented with the configurable representation of existing PKI hierarchy 160 with the changes specified in the PKI change template, a user may, via client device 110, interact with the configurable representation to accept and/or reject the proposed changes and/or further review, modify, and/or customize the PKI hierarchy After the user has completed review, modification, and/or customization of existing PKI hierarchy 160 (including any changes specified in the PKI change template), the final design of the PKI hierarchy may be presented (e.g., via client device 110) to the user. According to certain aspects of the present disclosure, presentation of the final design of the PKI hierarchy may also include an estimated cost for the PKI hierarchy. For example, the presentation of the estimated cost may include an itemization of the costs associated with the various components of the PKI hierarchy, as well as any incremental costs and/or savings realized by the changes to existing PKI hierarchy 160. Optionally, PKI creation service 130 may provide the user a further opportunity to review, modify, and/or customize the PKI hierarchy in view of the presented cost, and present a modified cost to the user in view of any modifications the user may make to the PKI hierarchy.

After the user has completed the review and/or modifications to the PKI hierarchy (including review of the cost information), PKI creation service 130 can facilitate deployment of the designed PKI hierarchy. For example, PKI creation service 130 can execute or provide a script (e.g., cloud formation template, etc.) that can facilitate creation and deployment of the PKI hierarchy.

Figure 2:
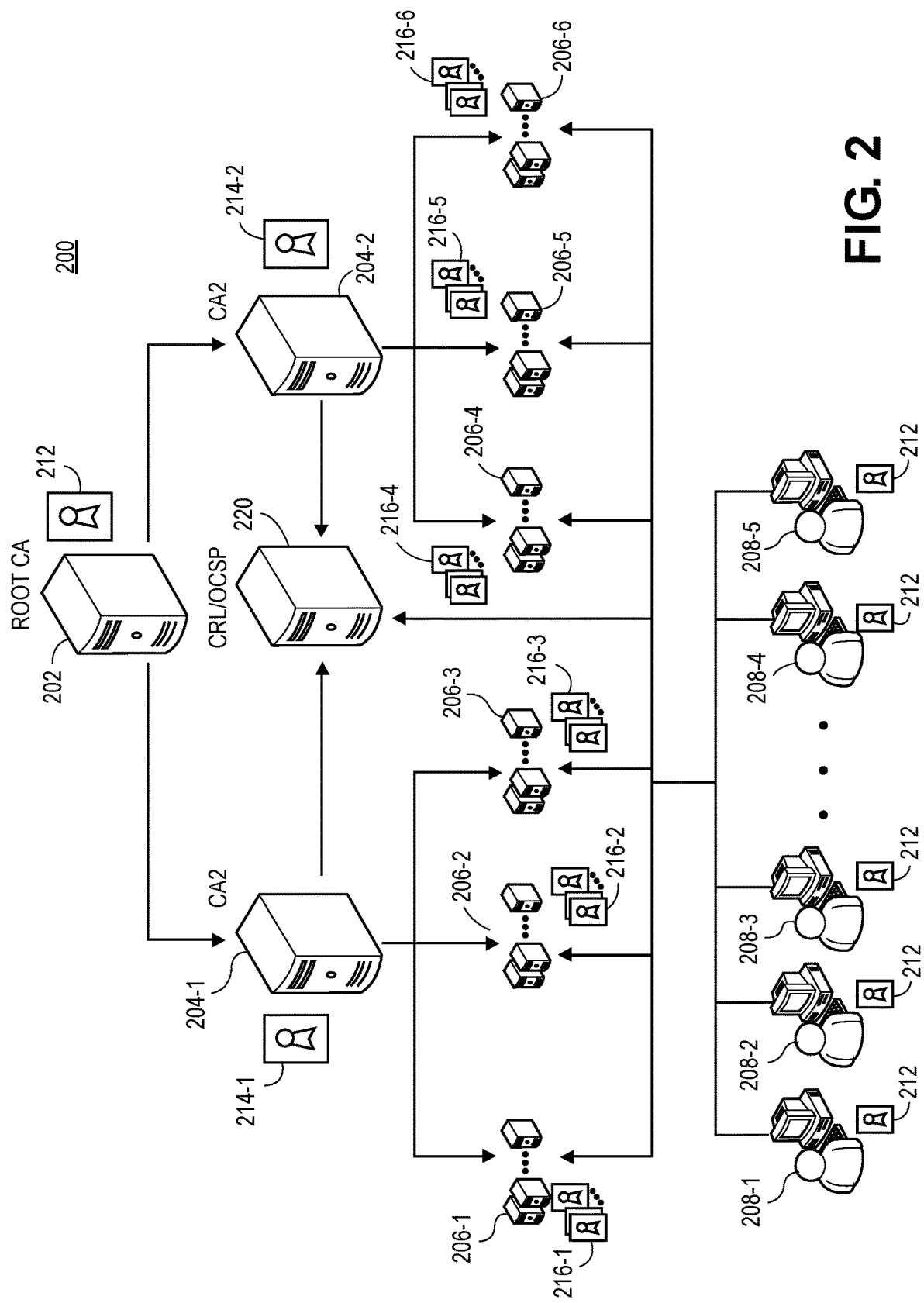
FIG. 2 is an illustration of an exemplary PKI hierarchy that may be designed and deployed according to exemplary embodiments of the present disclosure.

FIG. 2 is an illustration of an exemplary PKI hierarchy 200 that may be designed and deployed according to embodiments of the present disclosure. PKI hierarchy 200 is one illustrative example of a simple PKI hierarchy issuing server certificates, and it should be understood that embodiments of the present disclosure can design and deploy a PKI hierarchy having any design, configuration, settings, etc. beyond and/or less than PKI hierarchy 200 shown in FIG. 2 for any purpose (e.g., code signing, Internet of Things (IoT) devices, etc.).

As shown in FIG. 2, PKI hierarchy 200 can include root CA 202 with root certificate 212, subordinate CAs 204-1 and 204-2 with CA certificates 214-1 and 214-2, respectively, servers 206-1, 206-2, 206-3, 206-4, 206-5, and 206-6 with server certificates 216-1, 216-2, 216-3, 216-4, 216-5, 216-6, respectively, end users 208-1, 208-2, 208-3, 208-4, and 208-5 with root certificates 212, and certificate revocation service 220. In the implementation of PKI hierarchy 200 shown in FIG. 2, root CA 202 may issue root certificate 212 to itself and CA certificates 214-1 and 214-2 to CAs 204-1 and 204-2, respectively. Consequently, CA 204-1 may issue server certificates 216-1, 216-2, and 216-3 to servers 206-1, 206-2, and 206-3, respectively, and CA 204-2 may issue server certificates 216-4, 216-5, and 216-6 to servers 206-4, 206-5, and 206-6, respectively. Further, root certificate 212 may be embedded in the devices of end users 208-1, 208-2, 208-3, 208-4, and 208-5 and/or included in an organization's trust store as a trusted certificate.

In the implementation shown in FIG. 2, to establish secure communications between any of end users 208-1, 208-2, 208-3, 208-4, and 208-5 and any of servers 206-1, 206-2, 206-3, 206-4, 206-5, or 206-6, end users 208-1, 208-2, 208-3, 208-4, and 208-5 may validate server certificates 216-1, 216-2, 216-3, 216-4, 216-5, or 216-6 and CA certificates 214-1 and 214-2 using root certificate 212. For example, the public key associated with root certificate 212 can first be used to validate CA certificate 214-1 and/or 214-2. After CA certificate 214-1 and/or 214-2 has been validated, the public key associated with CA certificate 214-1 can be used to validate server certificates 216-1, 216-2, and 216-3, and the public key associated with CA certificate 214-2 can be used to validate server certificates 216-4, 216-5, and 216-6.

Further, certificate revocation (CRL) and/or online certificate status protocol (OCSP) service 220 may manage revoked certificates. This may include, for example, certificates and/or CAs that may have been compromised. According to certain aspects, CRL/OCSP service 220 may employ an online certificate status protocol to ensure the validity of the certificates issued and relied upon in PKI hierarchy 200. Accordingly, end users 208-1, 208-2, 208-3, 208-4, and 208-5 may confirm the status of any of subordinate CAs 204-1 and 204-2 and/or server certificates 216-1, 216-2, 216-3, 216-4, 216-5, or 216-6 and CA certificates 214-1 and 214-2 in validating the various certificates.

Additionally, it is noted that PKI hierarchy 200 may include various settings, configurations, parameters, etc. that are not shown in FIG. 2. For example, each of root CA 202, subordinate CAs 204-1 and 204-2, root certificate 212, CA certificates 214-1 and 214-2, server certificates may include a specified CA lifecycle. Further, subordinate CAs 204-1 and 204-2 may include a certificate template that may define certain properties in issued certificates (e.g., server certificates 216-1, 216-2, 216-3, 216-4, 216-5, or 216-6). Other security, access, management, sharing, etc. settings and configurations may also be deployed within PKI hierarchy 200.

Figure 3:
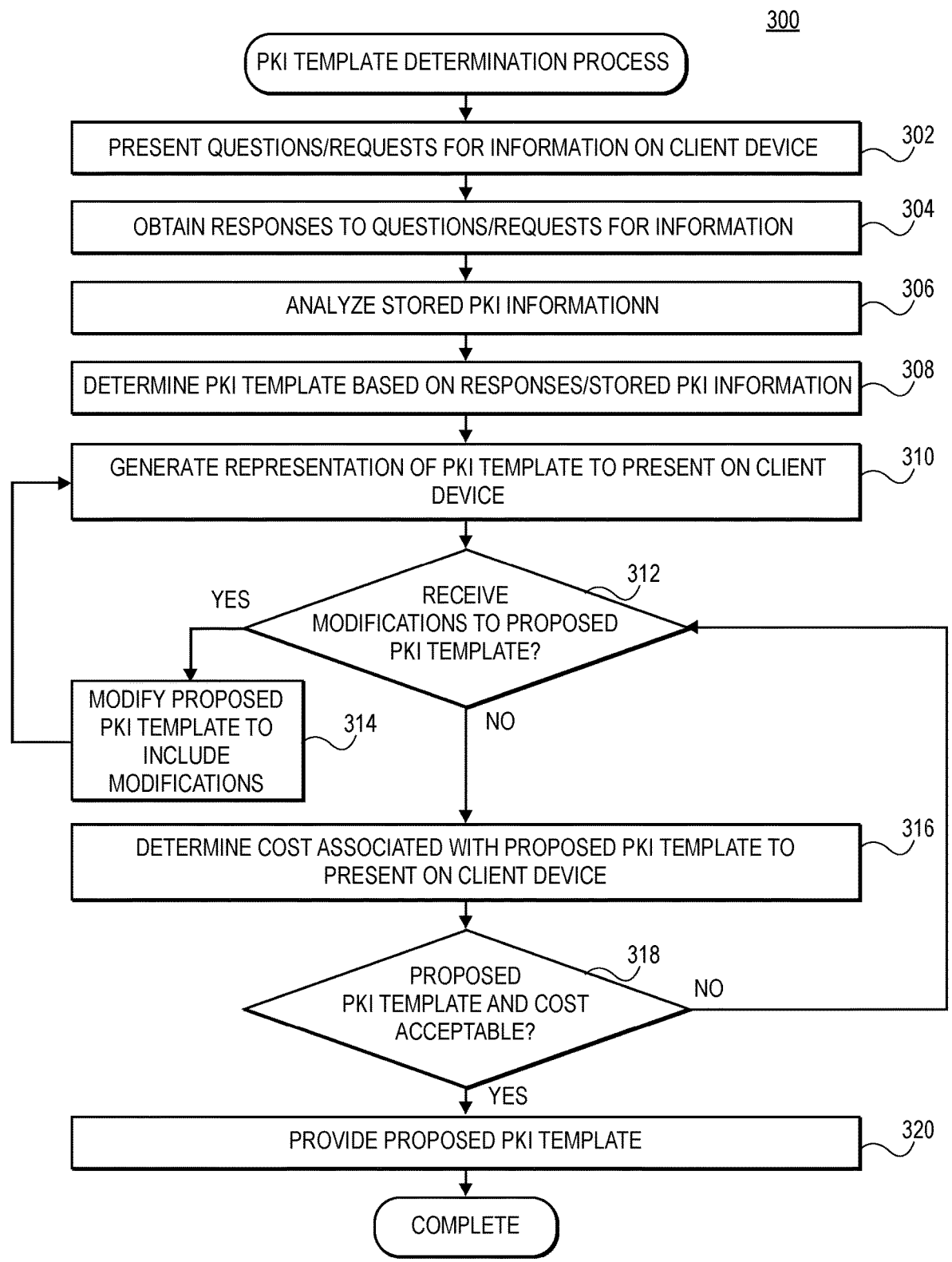
FIG. 3 is a flow diagram of a custom PKI template determination process, according to exemplary embodiments of the present disclosure.

FIG. 3 is a flow diagram of a custom PKI template determination process 300, according to exemplary embodiments of the present disclosure. According to certain exemplary embodiments, process 300 may be performed by PKI creation service 130 in determining custom PKI templates.

Custom PKI template determination process 300 may be performed, for example, by PKI creation service 130 to facilitate the design and deployment of a PKI hierarchy. As shown in FIG. 3, process may begin in step 302 with the presentation of a user interface to obtain information describing the system for which the PKI hierarchy is being designed and/or deployed. According to embodiments of the present disclosure, the user interface may include a form, questionnaire, wizard, etc. which may present one or more questions and/or requests for information describing certain aspects of the system for which the PKI hierarchy is to be deployed. For example, the user interface may ask questions and/or seek system information such as the purpose(s) and/or use(s) associated with the system for which the PKI hierarchy will be used (e.g., Kubernetes, Microsoft Active Directory, development and test environment, Internet of Things, etc.), what the certificates will be used for (e.g., client certificates, code signing certificates, server certificates, etc.), the users who will be regularly utilizing the PKI hierarchy (e.g., the subject, the relying party, etc.), the teams and/or users who will be managing the PKI hierarchy (e.g., a security team, a PKI team, a network administrator, an operations team, etc.), a contemplated usage model of the PKI hierarchy (e.g., CA and/or certificate lifecycles and rotation, certificate revocation, etc.), and the like.

In step 304, responses to the questions and/or requests for information may be obtained. According to certain embodiments, the questions and/or requests for information may be presented together via the user interface (e.g., as a single questionnaire type form) and the responses to the questions and/or the requests for information may be obtained at once. Alternatively and/or in addition, the questions and/or requests for information may be dynamically presented in a sequential manner such that one or more initial questions and/or requests for information are first presented, and subsequent questions and/or requests for information are selected and presented via the user interface based on responses obtained to previously presented questions and/or requests for information. In this regard, the dynamic sequential presentation of questions and/or requests for information may also performed in conjunction with presenting a configurable representation of the custom PKI template. For example, based on the response to the initial questions and/or requests for information, an initial custom PKI template may be generated and presented to the user. Subsequently, additional questions and/or requests for information may be presented alongside the configurable representation of the initial custom PKI template, and the configurable representation of the initial custom PKI template may be updated as responses to the additional questions and/or requests for information are received.

In step 306, stored PKI information (e.g., stored in PKI data store 140) may be accessed and analyzed. The stored PKI information may include, for example, information regarding the systems for which PKI hierarchies have been deployed, best practices information (e.g., published, learned, etc.) in connection with design parameters/characteristics and/or configurations for PKI hierarchy, information regarding the design and/or configuration of existing PKI hierarchies, feedback information obtained from organizations utilizing deployed PKI hierarchies, corresponding best practices PKI templates for a plurality of different use cases, and the like. Accordingly, as in step 308, the stored PKI information may be analyzed in view of the obtained system information to determine the custom PKI template, which may include recommended designs, configurations, settings, parameters, etc. for a PKI hierarchy to be deployed. For example, a knowledge-based system, an expert system, collaborative filtering algorithms, content filtering algorithms, a trained machine learning model, etc., or any combination thereof may be employed to analyze the stored information in view of the obtained system information in determining the custom PKI template. According to embodiments of the present disclosure, the custom PKI template may specify one or more of a template CA hierarchy configuration, CA roles (e.g., creation of identity and access management roles for management and operation of a CA, etc.) for each of the CAs included in the template CA hierarchy configuration, certificate templates to be deployed (certificate templates can specify certificate attributes such as, e.g., certificate signing algorithms, key pair length and key pair generation algorithms, etc.), security configurations (e.g., enabling alarms, logging and reporting security incidents, establishing reporting and access controls, etc.), CA lifecycles (e.g., expiration of CAs, rotation of CAs, etc.), certificate lifecycles (e.g., certificate expiration, certificate rotation, etc.), certificate and/or CA revocation, certificate distribution, managing trust from the CAs, and the like.

Once a custom PKI template has been determined, a configurable representation of the configuration of a PKI hierarchy as defined by the custom PKI template may be generated and presented, as in step 310. For example, the configurable representation may include a graphical representation of the configuration of a PKI hierarchy as defined by custom PKI template, which may be presented via a graphical user interface on a client device. The configurable representation of the custom PKI template may include the proposed CAs and the CA hierarchy, descriptions of the CA roles, descriptions of the security configurations, descriptions of the certificate template, description of CA and/or certificate lifecycles, description of CA and/or certificate revocation, and the like.

Once presented with the configurable representation of the configuration of a PKI hierarchy as defined by custom PKI template, a user may interact with the configurable representation to review, modify, and/or customize the configuration of the PKI hierarchy defined by the custom PKI template. Accordingly, in step 312, it may be determined whether any modifications to the configuration of the PKI hierarchy as defined by PKI template have been received. If modifications have been received, the custom PKI template may be modified to incorporate the modifications, as in step 314, and the process may return to step 310, where a configurable representation of the modified PKI template may be generated and presented. Optionally, additional changes and/or modifications may be determined based on the modifications that have been received. For example, the stored PKI information may again be analyzed in view of the received modifications to determine any additional changes to the custom PKI template that may be recommended based on the received modifications. These steps may be iteratively performed until there are no further modifications to the custom PKI template.

If no modifications are received, an estimated cost for the custom PKI template may be determined, as in step 316. This may include, for example, an itemization of the costs associated with the various components of the custom PKI template. In step 318, it can be determined whether the design and the cost of the custom PKI template are acceptable. If it is determined that the custom PKI template is not acceptable, the process may return to step 312 to determine if there are further modifications to the custom PKI template. Alternatively, if it is determined that the custom PKI template is acceptable, the custom PKI template may be provided to the user, as in step 320. For example, a script (e.g., cloud formation template, etc.) can be executed that can facilitate creation and deployment of the PKI hierarchy specified by the custom PKI template.

Figure 4A:
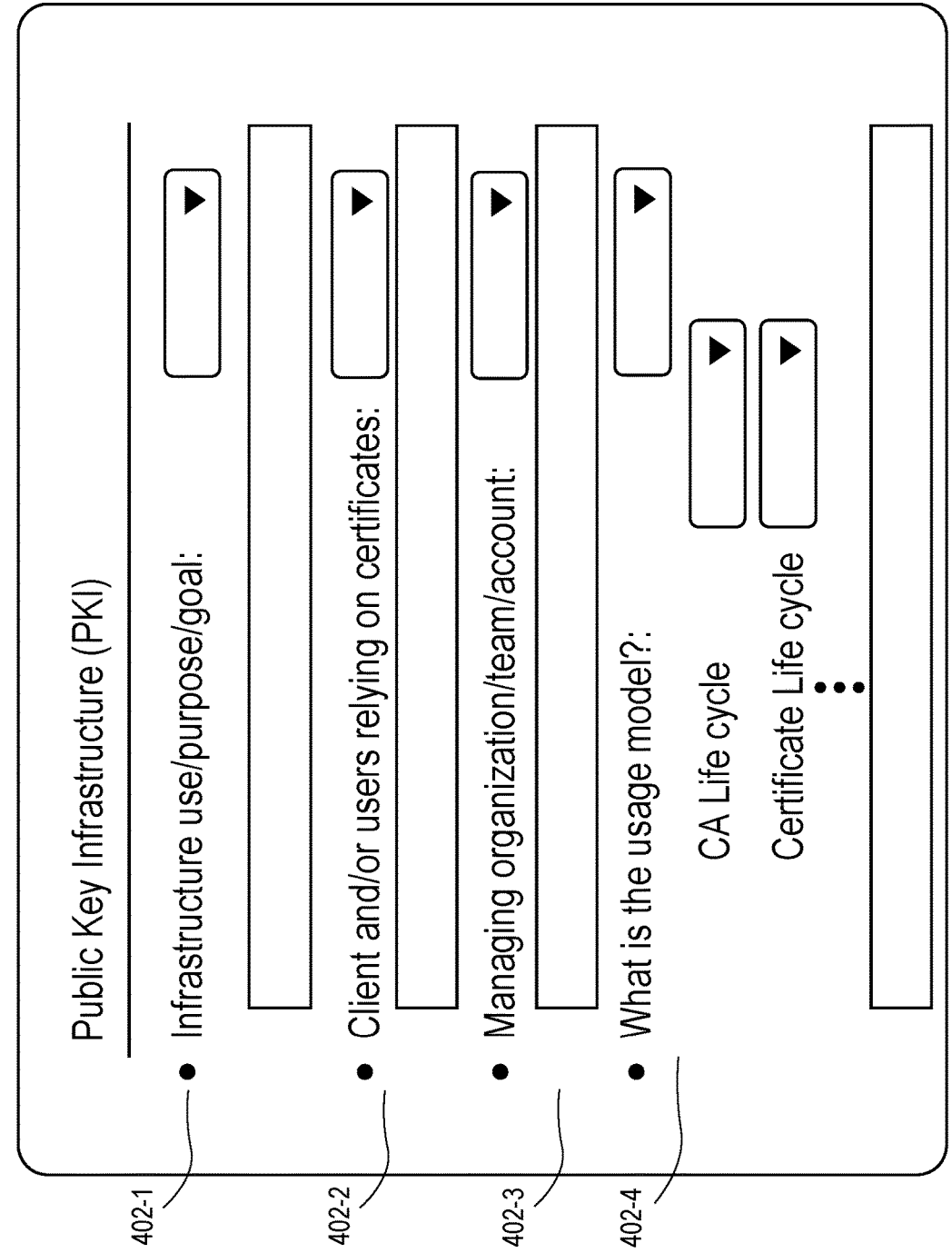
FIGS. 4A and 4B are illustrations of exemplary user interfaces through which infrastructure information may be obtained, according to exemplary embodiments of the present disclosure.
Figure 4B:
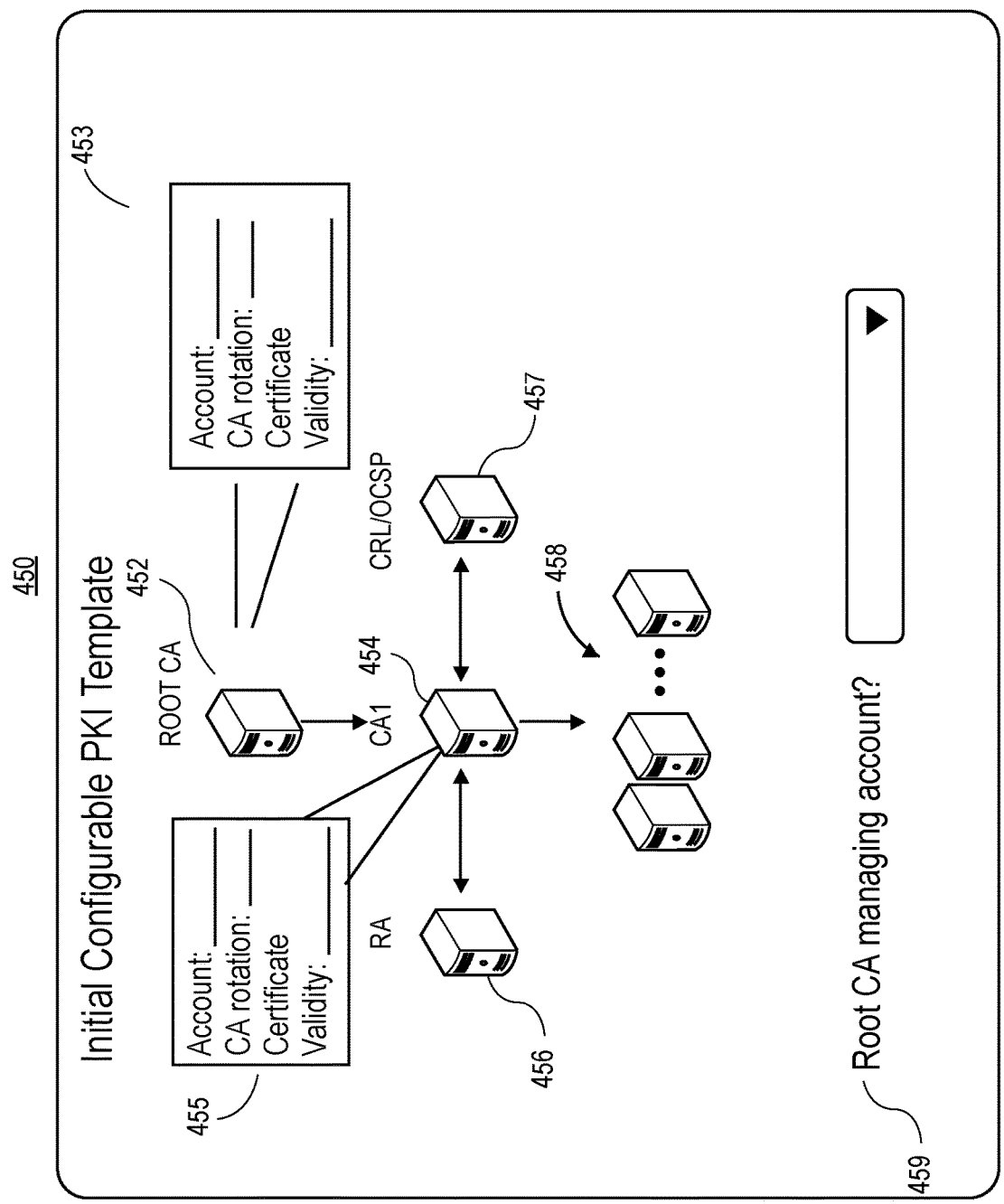

FIGS. 4A and 4B are exemplary user interfaces 400 and 450 through which system information may be obtained, according to exemplary embodiments of the present disclosure. According to certain exemplary embodiments, user interfaces 400 and 450 may be presented by PKI creation service 130 on client device 110 in determining custom PKI templates.

As shown in FIG. 4A, user interface 400 may present one or more questions and/or requests for information 402-1, 402-2, 402-3, and 402-4 regarding the system for which the PKI hierarchy is being designed and deployed. In the exemplary implementation shown in FIG. 4A, user interface 400 may seek information such as the purpose(s) and/or use(s) associated with the system for which the PKI hierarchy will be used and/or what the certificates will be used for (402-1), the users who will be regularly utilizing the PKI hierarchy (402-2), the teams and/or users who will be managing the PKI hierarchy (402-3), a contemplated usage model of the PKI hierarchy (402-4), and the like. Accordingly, responses to the questions and requests for information may be provided, via client device 110, to PKI creation service 130.

As shown in FIG. 4A, user interface 400 can include a form via which responses and/or information may be provided in response to the questions and/or requests for information. For example, user interface may include one or more questions and/or requests for information 402-1, 402-2, 402-3, and 402-4 which may describe the system for which the PKI hierarchy is being designed. Responses may be provided via selection of pre-populated selections (e.g., pull-down menus, radio buttons, etc.), free-text input (e.g., which may be processed using natural language processing algorithms, etc.), and the like. Alternatively, one or more questions and/or requests for information 402-1, 402-2, 402-3, and 402-4 may be presented in a wizard-type format, such that they are sequentially presented via a user interface. According to certain aspects, the one or more questions and/or requests for information 402-1, 402-2, 402-3, and 402-4 may be dynamically selected based on responses obtained to previously presented questions and/or requests for information 402-1, 402-2, 402-3, and 402-4.

FIG. 4B illustrates another exemplary user interface through which infrastructure information may be obtained for the determination of a custom PKI template. In the implementation shown in FIG. 4B, questions and/or requests for information may be presented concurrently with the presentation of a configurable representation of the custom PKI template as it is being designed and modified through the illustrated user interface. Accordingly, the custom PKI template may be built and modified as additional system information is concurrently obtained and/or manually provided through the illustrated user interface.

Prior to the implementation shown in FIG. 4B, one or more initial questions and/or requests for information may first have been presented. For example, one of the initial questions and/or requests for information may have asked the intended use and/or purpose of the system. Based on the response to the one or more initial questions and/or requests for information, initial configurable PKI template 450 may be determined. A configurable representation of the initial PKI template may be generated and presented by the illustrated user interface. As shown in FIG. 4B, initial PKI template 450 may include a CA hierarchy of a root CA 452, a subordinate CA1 454, a registration authority (RA) 456, and CRL/OCSP 457. Also, certain settings, parameters, configurations, etc. associated with initial PKI template 450, such as the CA and certificate lifecycles and managing account rights to the root CA and CA1, may yet to be established. Accordingly, additional information may be obtained through questions and/or requests for information 459 and the configurable representation of initial PKI template 450 may be updated based on the responses to questions and/or requests for information 459. Alternatively and/or in addition, a user may interact with the user interface to modify initial PKI template 450. For example, a user may respond to questions and/or requests for information 459, which may seek information regarding the management of root CA 452. Alternatively, a user may opt to simply fill in such information (e.g., in fields 453 and 454) via one or more interactions with the user interface. Accordingly, one or more additional questions and/or requests for information may be presented to the user via the user interface and additional settings, configurations, parameters, etc. may be determined based on the responses and the stored PKI information. Subsequently, the configurable representation of initial PKI template 450 may be updated in real-time to include the additional settings, configurations, parameters, etc. as the responses are processed. According to certain aspects, the questions and/or requests for information may be dynamically selected and presented based on the previously provided responses and/or modifications made to initial PKI template 450 via an interaction with the illustrated user interface.

Figure 5A:
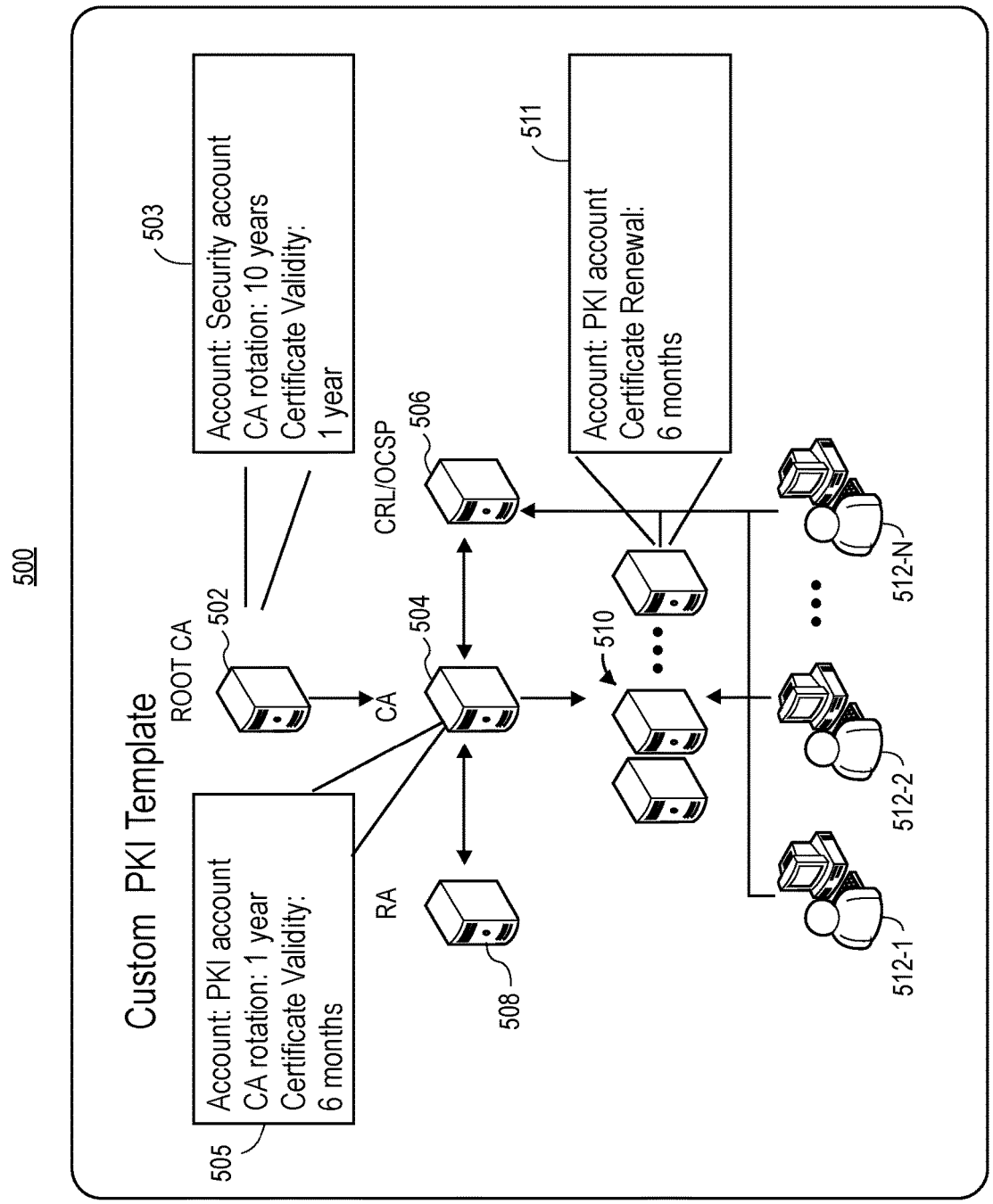
FIGS. 5A-5C are illustrations of exemplary user interfaces presenting configurable representations of a custom PKI template, according to exemplary embodiments of the present disclosure.
Figure 5B:
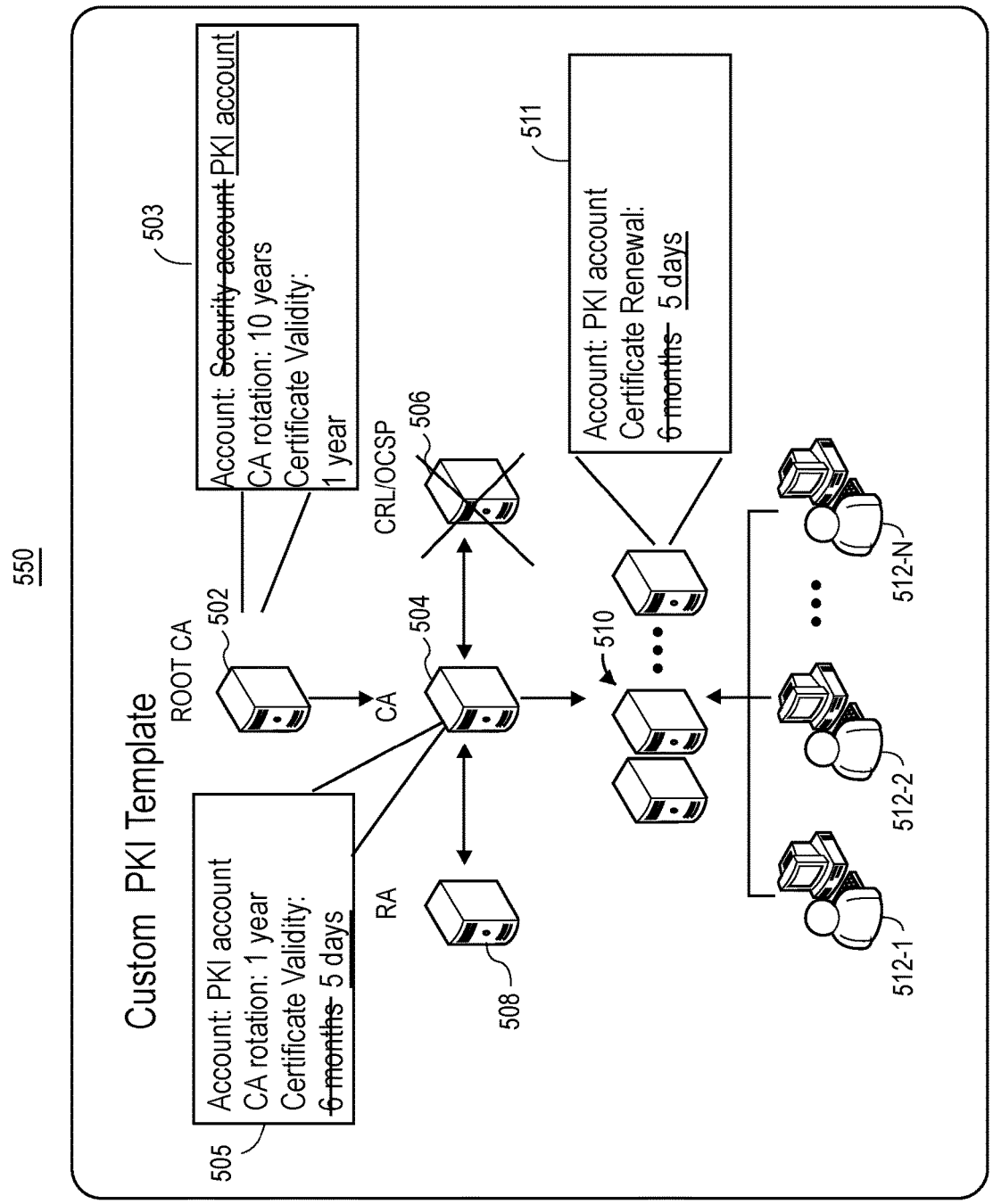
Figure 5C:
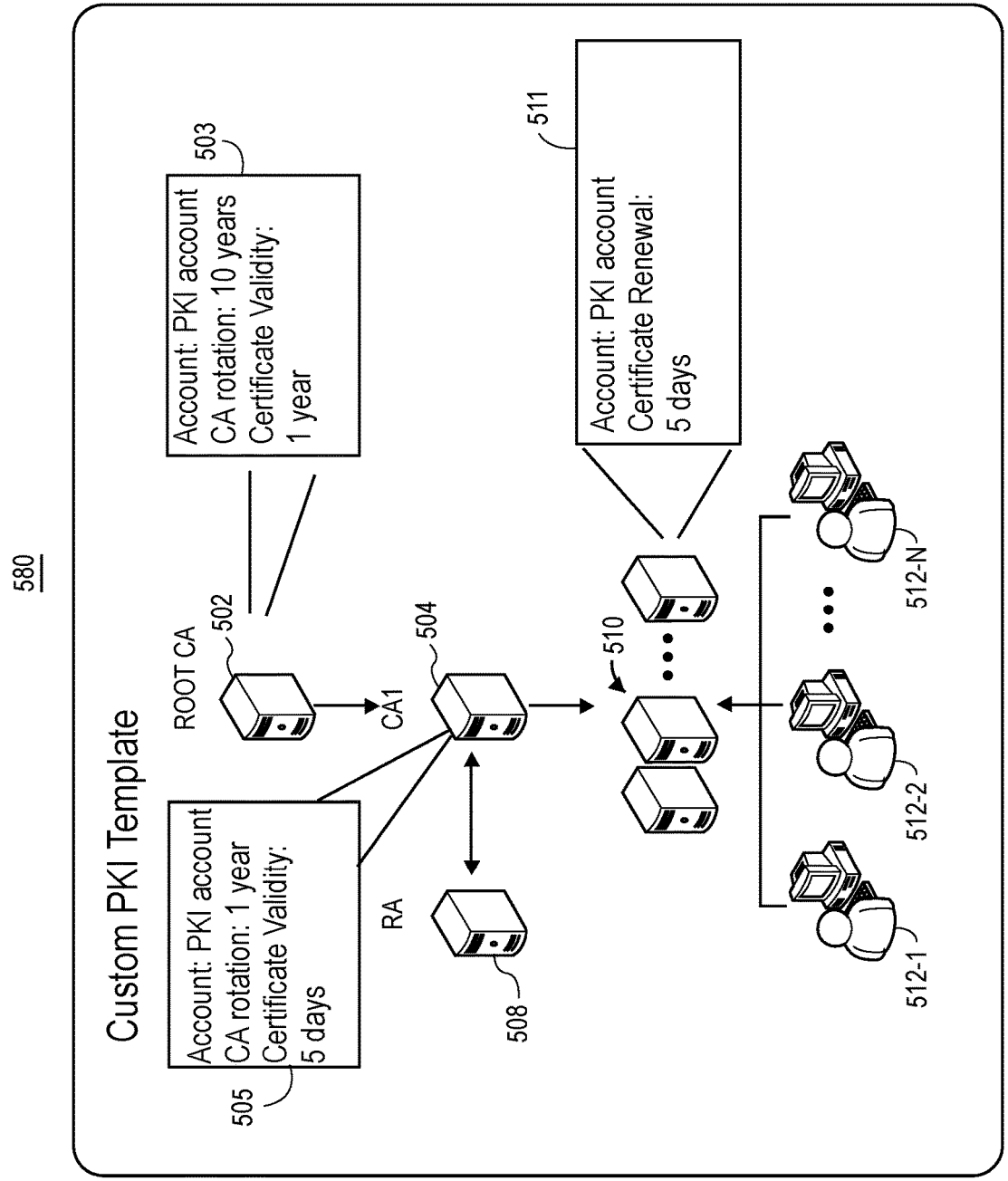

FIGS. 5A-5C are illustrations of exemplary user interfaces 500, 550, and 580 presenting configurable representations of a custom PKI template, according to exemplary embodiments of the present disclosure. According to certain exemplary embodiments, user interfaces 500, 550, and 580 may be presented by PKI creation service 130 on client device 110 in determining custom PKI templates.

FIG. 5A is an illustration of exemplary user interface 500 presenting a configurable representation of an exemplary custom PKI template, according to embodiments of the present disclosure. As shown in FIG. 5A, the custom PKI template may include root CA 502, subordinate CA 504, certificate revocation service 506, registration authority (RA) 508, servers 510, and end users 512-1, 512-2, and 512-N. Further, root CA 502 and subordinate CA 504 may include certain settings, parameters, configurations, etc. such as each CA's respective management account, CA lifecycle, certificate lifecycle, and the like. The custom PKI template may include other settings, parameters, configurations, etc., such as, for example, certificate templates, security configurations, and the like. The custom PKI template may have been determined based on the system information obtained in response to one or more questions and/or requests for information (e.g., via user interfaces 400 and/or 450). As described herein, the custom PKI template may have been determined based on an analysis of stored PKI data in view of the obtained system information. As shown in FIG. 5A, root CA 502 may have configuration 503 where it is specified that root CA 502 is configured to be managed by the security account, be rotated out every 10 years, and issues certificates that are valid for 1 year. Similarly, subordinate CA 504 may have configuration 505 where it is specified that subordinate CA 504 is configured to be managed by the PKI account, be rotated out every 1 year, and issues certificates that are valid for 6 months. Additionally, servers 510 have may configuration 511 where certificates are managed by the PKI account and are renewed every six months. Root CA 502, subordinate CA 504, and servers 510 may have other configurations associated with therewith.

As shown in FIG. 5A, user interface 500 may graphically present the custom PKI template (e.g., on client device 110). The presentation of the configurable representation of the custom PKI template via user interface 500 may facilitate review, modification, and/or customization of the custom PKI template. For example, a user may interact with user interface 500 to modify and/or further customize the custom PKI template. According to embodiments of the present disclosure, a user may modify any aspect of the custom PKI template. For example, the user may modify the CA hierarchy (e.g., remove, add, etc. one or more CAs), modify management and/or access rights assigned to the CAs, adjust the CA and/or certificate lifecycle, modify the certificate template, and the like.

FIG. 5B is an illustration of exemplary user interface 550 showing a user interaction with the configurable representation of the custom PKI template, according to embodiments of the present disclosure.

As shown in FIG. 5B, it may have been determined that the security account should not have access and management rights to root CA 502. For example, the organization for which the custom PKI template is being deployed may not have a separate security team. Accordingly, as shown in FIG. 5B, the user may have interacted with user interface 550 to modify the access and management rights associated with root CA 502 so as to change the access and management rights associated with root CA 502 from the security team to the PKI team.

Similarly, the user may have interacted with user interface 550 to shorten the certificate lifecycle of certificates issued by subordinate CA 504 from six months to five days. Accordingly, given the shortened lifecycle of the certificates issued by subordinate CA 504, the user may indicate that CRL/OCSP service 506 is no longer needed, and remove certificate revocation service 506 from the custom PKI template (e.g., denoted by the 'X' marking in FIG. 5B).

Alternatively and/or in addition, in response to the user's interaction with user interface 550 to shorten the certificate's lifecycle from six months to five days, the system (e.g., PKI creation service 130) may process the modification shortening the certificate's lifecycle from six months to five days and may suggest that CRL/OCSP service 506 be removed. Accordingly, based on any modifications to the custom PKI template, the system (e.g., PKI creation service 130) may determine and present one or more recommended further changes to the custom PKI template.

FIG. 5C is an illustration of exemplary user interface 580 presenting a configurable representation of a final design of the custom PKI template, according to embodiments of the present disclosure.

As shown in FIG. 5C, user interface 580 may present a configurable representation of the custom PKI template after the user has completed review, modification, and/or customization of the custom PKI template and all modifications have been entered. According to certain aspects of the present disclosure, presentation of the final design of the PKI hierarchy may also include an estimated cost for the PKI hierarchy specified by the custom PKI template. Optionally, the user may have an opportunity to further modify and/or customize the custom PKI template based on the estimated cost.

After the user has completed the review and/or modifications to the PKI hierarchy (including review of the cost information), embodiments of the present disclosure can facilitate creation and deployment of the designed PKI hierarchy (e.g., cloud formation template, etc.).

Figure 6A:
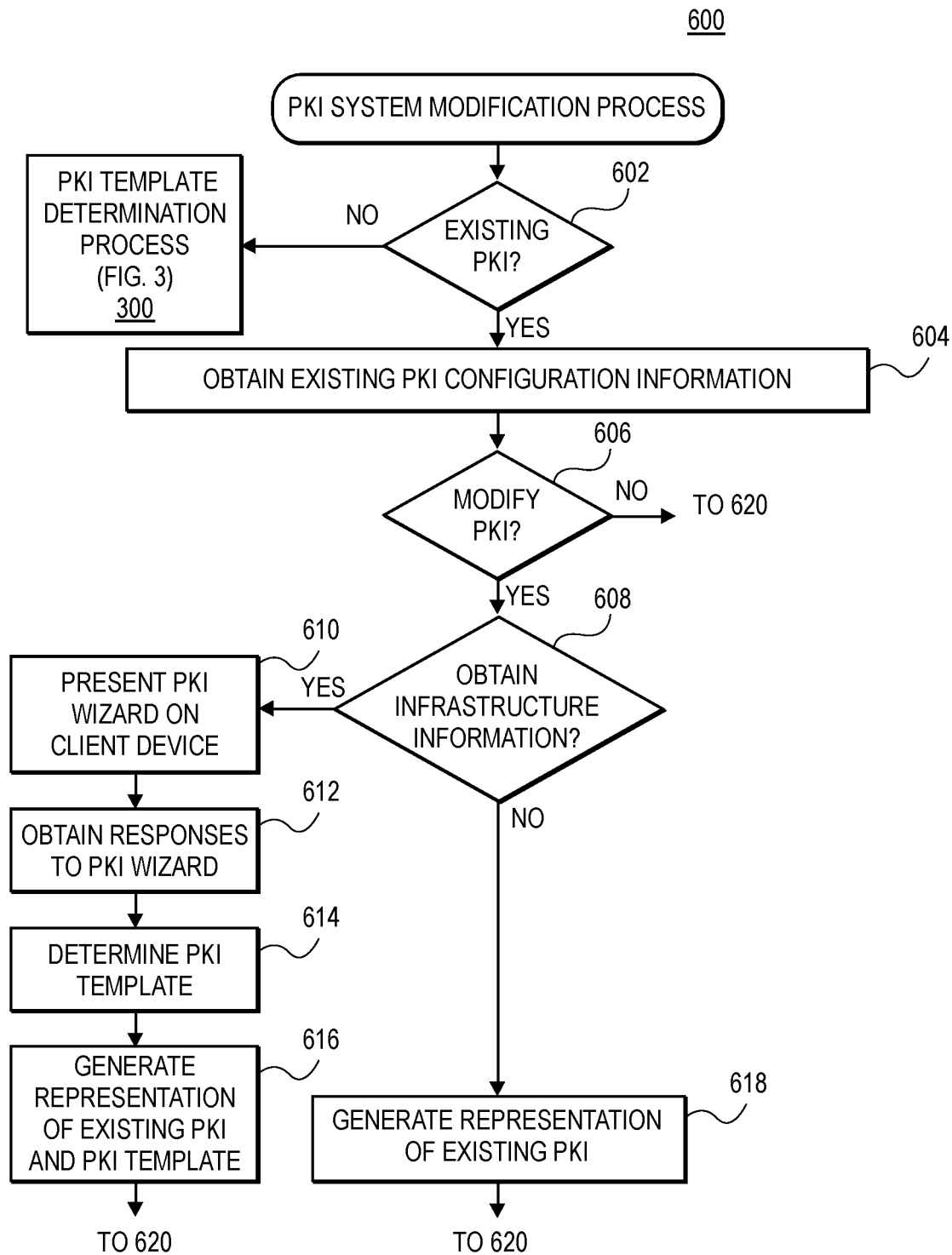
FIGS. 6A and 6B illustrate a flow diagram of an exemplary existing PKI hierarchy modification process, according to exemplary embodiments of the present disclosure.
Figure 6B:
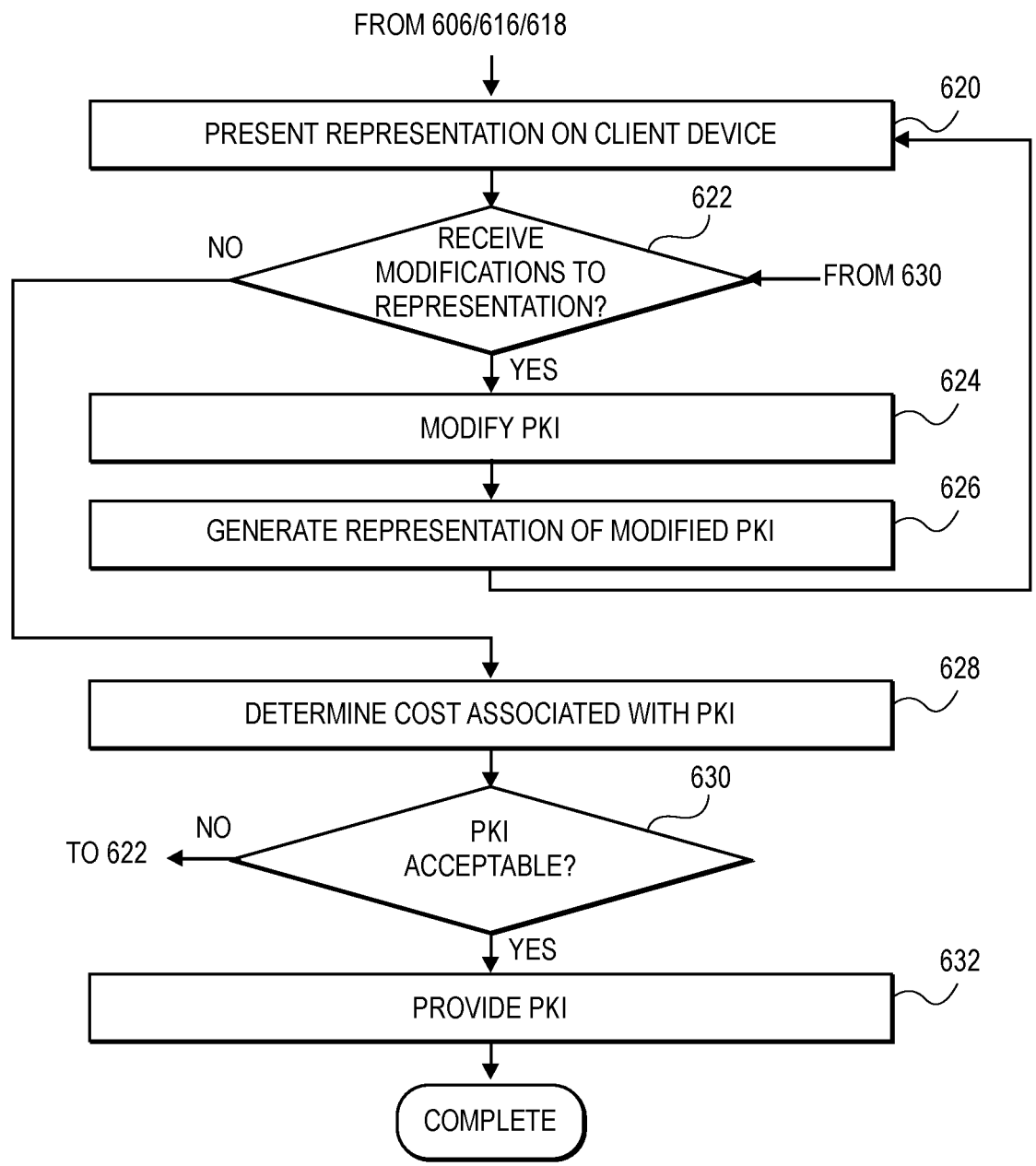

FIGS. 6A and 6B illustrate a flow diagram of an exemplary PKI hierarchy modification process 600, according to embodiments of the present disclosure. According to certain exemplary embodiments, process 600 may be performed by PKI creation service 130 in determining and modifying an existing PKI hierarchy.

As shown in FIGS. 6A and 6B, process 600 may begin with a determination whether there is an existing PKI hierarchy, as in step 602. If no existing PKI hierarchy exists, process 600 may proceed to process 300 to determine a custom PKI template, as shown in FIG. 3. In the event that there is an existing PKI hierarchy, information regarding the existing PKI hierarchy's configuration may be obtained, in step 604. For example, the existing PKI hierarchy's configuration information may provide details regarding the design, configuration, settings, etc. associated with the existing PKI hierarchy, which may be obtained by analyzing the CAs and/or the certificates issued by the CAs in the existing PKI hierarchy to identify information such as the type of certificates being issued, the keys being used to sign the certificates, the subject of the certificates, the lifecycles of the certificates and/or the CAs, the signing CAs, security settings associated with the CAs, management rights associated with the CAs, the CA hierarchy, etc.

After the existing PKI hierarchy's configuration information has been obtained, it may be determined whether the user desires to modify the existing PKI hierarchy, as in step 606. For example, the user may be presented with an option to provide an indication whether additional the existing PKI hierarchy is to be modified. In the event that a user indicates that the existing PKI hierarchy is not to be modified, a configurable representation of the existing PKI hierarchy may be generated, in step 618 and presented on a client device, as in step 620.

If it is determined that the existing PKI hierarchy is to be modified, it may next be determined whether information regarding the existing PKI hierarchy and the system for which the PKI hierarchy is being used is needed. For example, the user may be presented with an option to provide an indication whether additional information regarding the changes to the PKI hierarchy and/or the system for which the PKI hierarchy is being used is to be provided. In the event that the user indicates that the no additional information is to be provided, a configurable representation of the existing PKI hierarchy may be generated, in step 618 and presented on a client device, as in step 620.

Alternatively, if it is indicated that additional information is to be provided, a user interface presenting questions and/or requests for information pertaining to information describing the system/infrastructure and/or changes to the existing PKI hierarchy may be presented, as in step 610. According to embodiments of the present disclosure, the user interface may include a form, questionnaire, wizard, etc. which may present one or more questions and/or requests for information which may describe the system/infrastructure for which the existing PKI hierarchy is being used, changes to the system that are being contemplated, new systems that may utilize the existing PKI hierarchy, changes to the existing PKI hierarchy that are being contemplated, and the like. For example, the user interface may ask questions and/or seek infrastructure information such as the purpose(s) and/or use(s) associated with the system for which the existing PKI hierarchy is being used, the purpose(s) and/or use(s) associated with any modifications to the system and/or any new systems, changes to the teams and/or users who will be managing the existing PKI hierarchy, changes to the usage model of the existing PKI hierarchy, and the like.

In step 612, responses to the questions and/or requests for information may be obtained and the stored PKI information may be accessed. According to certain embodiments, the questions and/or requests for information may be presented together via the user interface (e.g., as a single questionnaire type form) and the responses to the questions and/or the requests for information may be obtained at once. Alternatively and/or in addition, the questions and/or requests for information may be dynamically presented in a sequential manner such that one or more initial questions and/or requests for information are first presented, and subsequent questions and/or requests for information are selected and presented via the user interface based on responses obtained to previously presented questions and/or requests for information. In this regard, the dynamic sequential presentation of questions and/or requests for information may also performed in conjunction with presenting a configurable representation of the custom PKI template. For example, based on the response to the initial questions and/or requests for information, an initial custom PKI template may be generated and presented to the user. Subsequently, additional questions and/or requests for information may be presented alongside the configurable representation of the initial custom PKI template, and the configurable representation of the initial custom PKI template may be updated as responses to the additional questions and/or requests for information are received.

In step 614, based on the responses to the questions and requests for information, a PKI change template may be determined. For example, based on the obtained information and the plurality of stored PKI information (e.g., stored in PKI data store 140), a PKI change template may be determined. Similar to determination of the custom PKI template, the stored PKI information may include information regarding the systems for which PKI hierarchies have been deployed, best practices information (e.g., published, learned, etc.) in connection with design parameters/characteristics and/or configurations for PKI hierarchies, information regarding the design and/or configuration of existing PKI hierarchies, feedback information obtained from organizations utilizing deployed PKI hierarchies, corresponding best practices PKI templates for a plurality of different use cases, and the like. Accordingly, the stored PKI information may be analyzed in view of the obtained information to determine recommended changes to the existing PKI hierarchy. For example, a knowledge-based system, an expert system, collaborative filtering algorithms, content filtering algorithms, a trained machine learning model, etc., or any combination thereof may be employed to analyze the stored information in view of the obtained system information in determining the PKI change template. According to embodiments of the present disclosure, the PKI change template may specify one or more changes to the CA hierarchy configuration, CA roles (e.g., creation of identity and access management roles for management and operation of a CA, etc.) for each of the CAs, certificate templates to be deployed (certificate templates can specify certificate attributes such as, e.g., certificate signing algorithms, key pair length and key pair generation algorithms, etc.), security configurations (e.g., enabling alarms, logging and reporting security incidents, establishing reporting and access controls, etc.), CA lifecycles (e.g., expiration of CAs, rotation of CAs, etc.), certificate lifecycles (e.g., certificate expiration, certificate rotation, etc.), certificate and/or CA revocation, certificate distribution, managing trust from the CAs, etc. associated with the existing PKI hierarchy.

After determination of the PKI change template, a configurable representation (e.g., a graphical representation, etc.) of the existing PKI hierarchy, along with the PKI change template may be generated, as in step 616. The configurable representation of the PKI change template may be overlayed onto the configurable representation of the existing PKI hierarchy with an indication (e.g., dashed lines, highlighting, grayed out coloring, side-by-side comparison with and without the proposed changes, etc.) identifying the proposed changes. Similar to the configurable representation of the custom PKI template, the configurable representation of the existing PKI hierarchy with the PKI change template may include the CA hierarchy, descriptions of the CA roles, descriptions of the security configurations, descriptions of the certificate template, description of CA and/or certificate lifecycles, description of CA and/or certificate revocation, etc. associated with the existing PKI hierarchy with the PKI change template. Once presented with the configurable representation of existing PKI hierarchy 160, a user may, via client device 110, interact with the configurable representation to review, update, modify, and/or customize existing PKI hierarchy 160. For example, a user may modify the number of CAs and/or the CA hierarchy, change access and/or management of the CAs, etc. The configurable representation may then be presented on the client device, as in step 620.

Once presented with the configurable representation of the existing PKI hierarchy with the PKI change template, a user may interact with the configurable representation to review, modify, and/or customize the existing PKI hierarchy with the PKI change template. Accordingly, in step 622, it may be determined whether any modifications to the existing PKI hierarchy with the PKI change template have been received. If modifications have been received, the modifications may be incorporated, as in step 624, and the configurable representation including the modifications may be generated in step 626. Optionally, additional changes and/or modifications may be determined based on the modifications that have been received. For example, the stored PKI information may again be analyzed in view of the received modifications to determine any additional changes to the custom PKI template that may be recommended based on the received modifications. The process may then return to step 620 to again present the configurable representation. These steps may be iteratively performed until there are no further modifications.

If no modifications are received, an estimated cost for the PKI hierarchy (e.g., the existing PKI hierarchy with the changes presented in the PKI change template) may be determined, as in step 628. This may include, for example, an itemization of the costs associated with the various components of the PKI hierarchy. In step 630, it can be determined whether the design and the cost of the PKI hierarchy are acceptable. If it is determined that the custom PKI template is not acceptable, the process may return to step 622 to determine if there are further modifications to the PKI hierarchy. Alternatively, if it is determined that the PKI hierarchy is acceptable, the PKI hierarchy may be provided to the user, as in step 632. For example, a script (e.g., cloud formation template, etc.) can be executed that can facilitate creation and deployment of the PKI hierarchy.

Figure 7A:
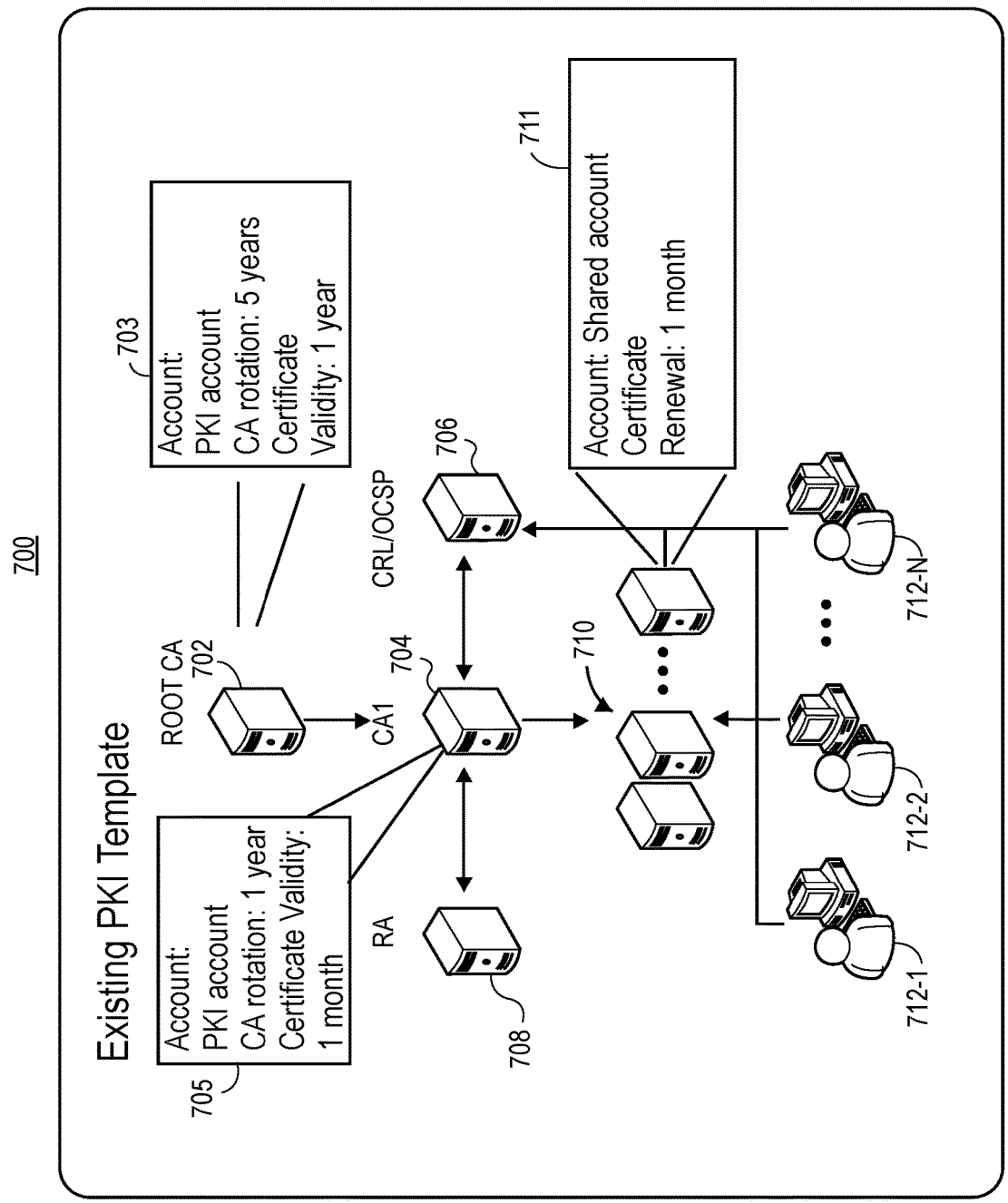
FIGS. 7A-7C are illustrations of exemplary user interfaces presenting configurable representations of an existing PKI hierarchy, according to exemplary embodiments of the present disclosure.
Figure 7B:
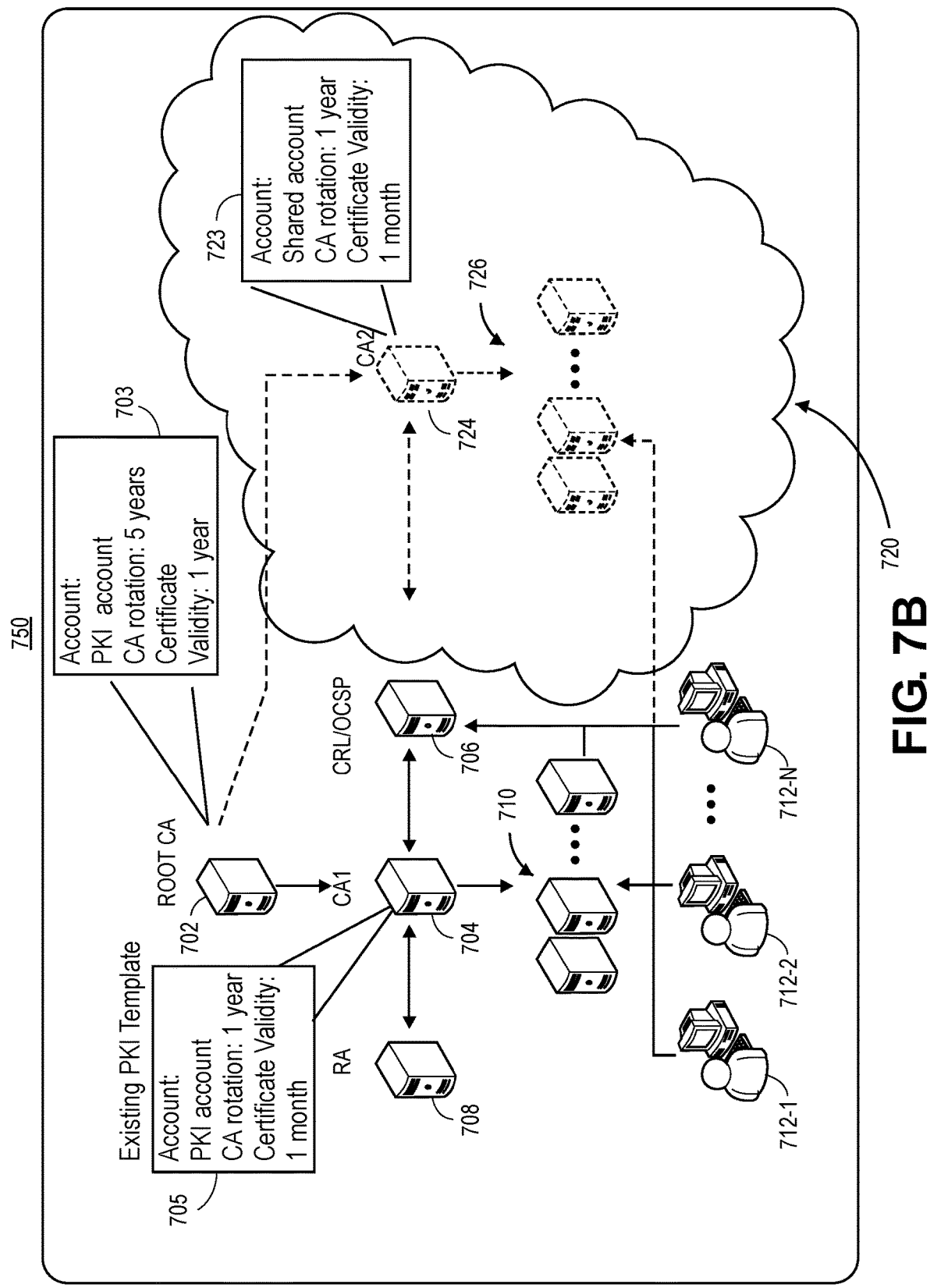
Figure 7C:
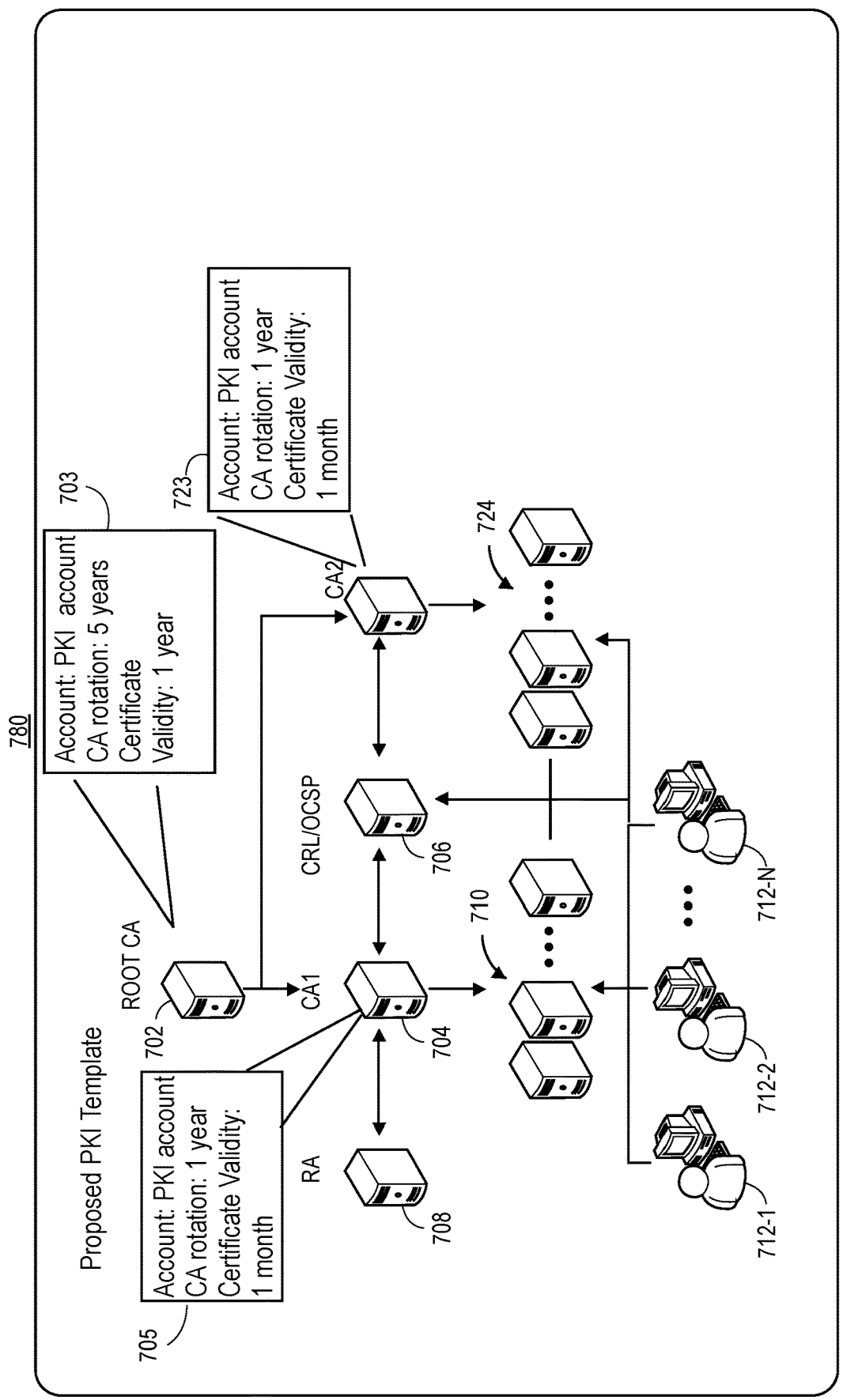

FIGS. 7A-7C are illustrations of exemplary user interfaces 700, 750, and 780 presenting configurable representations of an existing PKI hierarchy, according to exemplary embodiments of the present disclosure. According to certain exemplary embodiments, user interfaces 700, 750, and 780 may be presented by PKI creation service 130 on client device 110 in analyzing, reviewing, and/or modifying an existing PKI hierarchy.

FIG. 7A is an illustration of exemplary user interface 700 presenting a configurable representation of an existing PKI hierarchy, according to embodiments of the present disclosure. As shown in FIG. 7A, the existing PKI hierarchy may include root CA 702, subordinate CA 704, certificate revocation service 706, registration authority (RA) 708, servers 710, and end users 712-1, 712-2, and 712-N. Further, root CA 702 and subordinate 704 may include certain settings, parameters, configurations, etc. such as each CA's respective access right, CA lifecycle, certificate lifecycle, and the like. The existing PKI hierarchy may include other settings, parameters, configurations, etc., such as, for example, certificate templates, security configurations, and the like. The existing PKI hierarchy may have been determined based on information obtained regarding the existing PKI hierarchy's configuration. For example, the CAs and/or the certificates issued by the CAs in the existing PKI hierarchy may have been analyzed to identify information such as the type of certificates being issued, the keys being used to sign the certificates, the subject of the certificates, the lifecycles of the certificates and/or the CAs, the signing CAs, security settings associated with the CAs, management rights associated with the CAs, the CA hierarchy, etc. As shown in FIG. 7A, root CA 702 may have configuration 703 where it is specified that root CA 502 is configured to be managed by the PKI account, be rotated out every 5 years, and issues certificates that are valid for 1 year. Similarly, subordinate CA 704 may have configuration 705 where it is specified that subordinate CA 704 is configured to be managed by the PKI account, be rotated out every 1 year, and issues certificates that are valid for 1 month. Additionally, servers 710 may have configuration 711 where certificates are managed by the Shared account and are renewed every month. Root CA 702, subordinate CA 704, and servers 710 may have other configurations associated with therewith.

FIG. 7B is an illustration of exemplary user interface 750 presenting a configurable representation of the existing PKI hierarchy with PKI change template720, according to embodiments of the present disclosure. As shown in FIG. 7B, PKI change template 720 may include subordinate CA 724 and servers 726 and may be presented alongside the configurable representation of the existing PKI hierarchy. As shown in FIG. 7B, PKI change template 720 may be represented alongside the configurable representation of the existing PKI hierarchy with an indication (e.g., dashed lines, highlighting, grayed out coloring, side-by-side comparison with and without the proposed changes, etc.) identifying the proposed changes. Proposed subordinate CA 724 may have configuration 723 where it is specified that subordinate CA 724 is configured to be managed by the shared account, be rotated out every 1 year, and issues certificates that are valid for 1 month. Subordinate CA 724 may have other configurations associated with therewith.

According to embodiments of the present disclosure, PKI change template 720 may have been determined based on obtained infrastructure information and the plurality of stored PKI information (e.g., stored in PKI data store 140). Similar to determination of the custom PKI template, the stored PKI information may include information regarding the systems for which PKI hierarchies have been deployed, best practices information (e.g., published, learned, etc.) in connection with design parameters/characteristics and/or configurations for PKI hierarchies, information regarding the design and/or configuration of existing PKI hierarchies, feedback information obtained from organizations utilizing deployed PKI hierarchies, corresponding best practices PKI templates for a plurality of different use cases, and the like. Accordingly, the stored PKI information may be analyzed in view of the obtained information to determine recommended changes to the existing PKI hierarchy. For example, a knowledge-based system, an expert system, collaborative filtering algorithms, content filtering algorithms, a trained machine learning model, etc., or any combination thereof may be employed to analyze the stored information in view of the obtained infrastructure information in determining the PKI change template.

According to embodiments of the present disclosure, PKI change template 720 may specify one or more changes to the CA hierarchy configuration, CA roles (e.g., creation of identity and access management roles for management and operation of a CA, etc.) for each of the CAs, certificate templates to be deployed (certificate templates can specify certificate attributes such as, e.g., certificate signing algorithms, key pair length and key pair generation algorithms, etc.), security configurations (e.g., enabling alarms, logging and reporting security incidents, establishing reporting and access controls, etc.), CA lifecycles (e.g., expiration of CAs, rotation of CAs, etc.), certificate lifecycles (e.g., certificate expiration, certificate rotation, etc.), certificate and/or CA revocation, certificate distribution, managing trust from the CAs, etc. associated with the existing PKI hierarchy.

Similar to the configurable representation of the custom PKI template, the configurable representation of the existing PKI hierarchy with the PKI change template may include the CA hierarchy, descriptions of the CA roles, descriptions of the security configurations, descriptions of the certificate template, description of CA and/or certificate lifecycles, description of CA and/or certificate revocation, etc. associated with the existing PKI hierarchy with the PKI change template. Once presented with the configurable representation of existing PKI hierarchy 160, a user may, via client device 110, interact with the configurable representation to review, update, modify, and/or customize existing PKI hierarchy 160. For example, a user may modify the number of CAs and/or the CA hierarchy, change access and/or management of the CAs, etc. The configurable representation may then be presented on the client device.

Once presented with the configurable representation of the existing PKI hierarchy with PKI change template 720, a user may interact with user interface 750 to review, modify, and/or customize the PKI hierarchy comprised of the existing PKI hierarchy and changes specified by PKI change template 720. For example, the changes specified by PKI change template 720 may be adopted, revised, and/or rejected. Additionally, a user may modify, portions of the existing PKI hierarchy. According to embodiments of the present disclosure, as described in connection with FIGS. 1A, 1B, 3, 5B, 6A, and 6B, further changes, modifications, and/or revisions may be determined and/or presented in view of any changes and/or modifications to the PKI hierarchy comprised of the existing PKI hierarchy and changes specified by PKI change template 720.

FIG. 7C is an illustration of exemplary user interface 780 presenting a configurable representation of the final PKI hierarchy, according to embodiments of the present disclosure.

As shown in FIG. 7C, user interface 780 may present a configurable representation of the PKI hierarchy after the user has completed review, modification, and/or customization of the existing PKI hierarchy with PKI change template 720. In the illustrative implementation shown in FIG. 7C, the changes specified by PKI change template 720 have been accepted and no further changes or modifications have been made. Alternatively and/or in addition, the user may adopt, revise, and/or rejected the changes specified by PKI change template 720 and/or modify, portions of the existing PKI hierarchy. According to certain aspects of the present disclosure, presentation of the final design of the PKI hierarchy may also include an estimated cost for the PKI hierarchy. Optionally, the user may have an opportunity to further modify and/or customize the custom PKI template in view of estimated cost.

After the user has completed the review and/or modifications to the PKI hierarchy (including review of the cost information), embodiments of the present disclosure can facilitate creation and deployment of the designed PKI hierarchy (e.g., cloud formation template, etc.).

Figure 8:
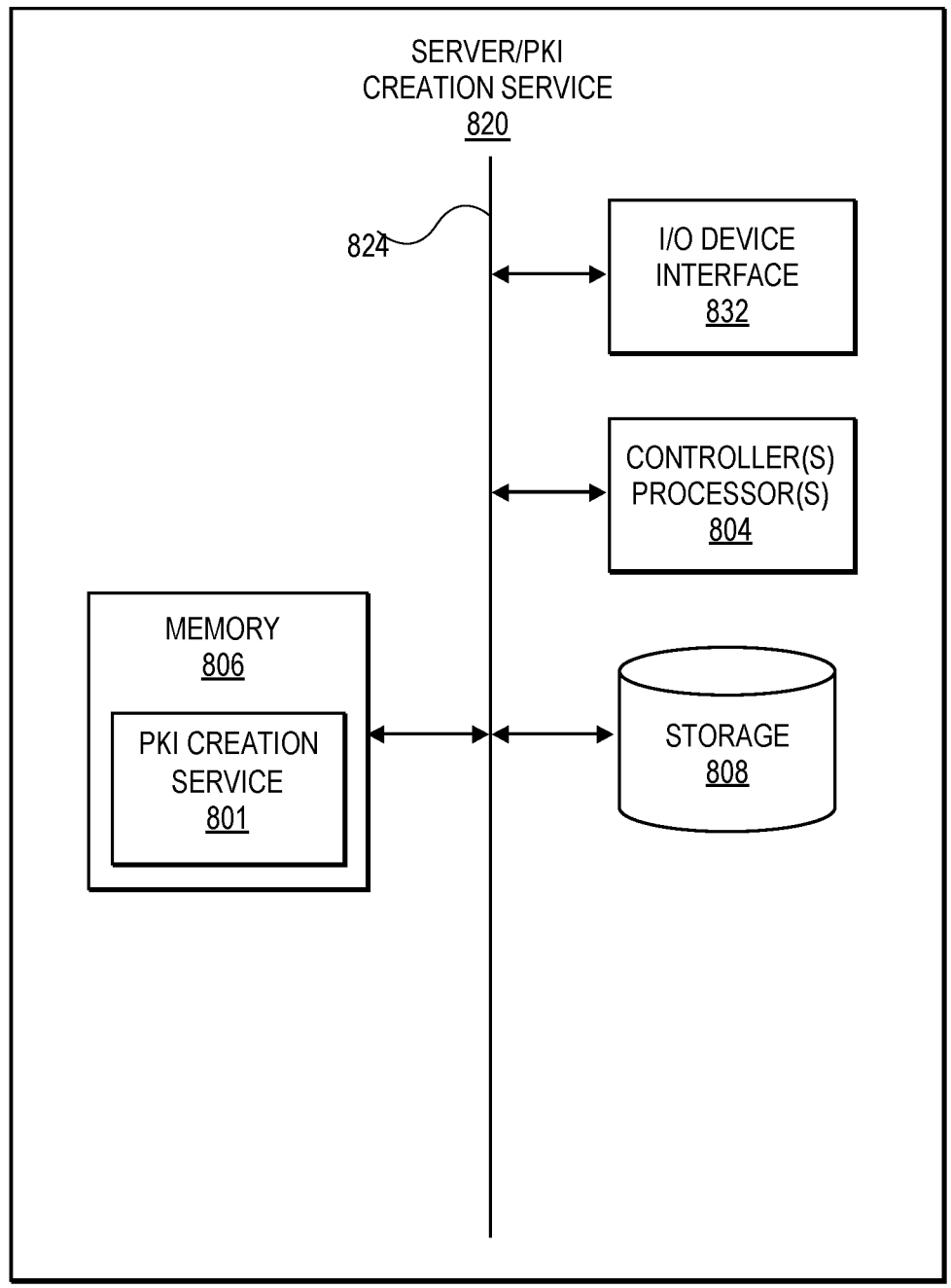
FIG. 8 is a block diagram of an exemplary remote computing device, according to exemplary embodiments of the present disclosure.

FIG. 8 is a block diagram of an exemplary remote computing device, according to embodiments of the present disclosure.

FIG. 8 illustrates example components of a remote computing device or a stand-alone server/PKI creation service 820, in accordance with embodiments of the present disclosure. The components illustrated in FIG. 8 may also be representative of any other device in which the PKI creation service may be included, and multiple such servers/PKI creation service 820 may be included in the system. In operation, server/PKI creation service 820 may include computer-readable and computer-executable instructions that reside on server/PKI creation service 820, as will be discussed further below.

Server/PKI creation service 820 may include one or more controllers/processors 804, that may include a central processing unit (CPU) for processing data and computer-readable instructions, and a memory 806 for storing data and instructions of the respective device. Memory 806 may individually include volatile random-access memory (RAM), non-volatile read only memory (ROM), non-volatile magnetoresistive (MRAM) and/or other types of memory. Server/PKI creation service 820 may also include data storage component 808, for storing data and controller/processor-executable instructions. Data storage component 808 may include one or more non-volatile storage types such as magnetic storage, optical storage, solid-state storage, etc. Server/PKI creation service 820 may also be connected to removable or external non-volatile memory and/or storage (such as a removable memory card, memory key drive, networked storage, etc.) through input/output device interface 832.

Computer instructions for operating server/PKI creation service 820 and its various components may be executed by controller(s)/processor(s) 804, using the memory 806 as temporary "working" storage at runtime. Server/PKI creation service's 820 computer instructions may be stored in a non-transitory manner in non-volatile memory 806, storage 808, or one or more external device(s). For example, PKI creation service 801, which may be implemented in software that is stored in memory 806 and executed by one or more processors 804, may be operable to perform some or all of the implementations discussed herein. Alternatively, some or all of the executable instructions of PKI creation service 801 and/or executable instructions for other components of server/PKI creation service 820 may be embedded in hardware or firmware, in addition to or instead of, software.

Server/PKI creation service 820 may also include input/output device interfaces 832. A variety of components may be connected through the input/output device interfaces. Additionally, server/PKI creation service 820 may include address/data bus 824 for conveying data among components of server/PKI creation service 820. Each component within server/PKI creation service 820 may also be directly connected to other components in addition to (or instead of) being connected to other components across bus 824.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, encryption, etc., should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media. In addition, one or more of the components may be implemented in firmware or hardware.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method to determine a public key infrastructure (PKI) hierarchy, comprising:
obtaining, from a client device, a plurality of infrastructure information associated with a network system for which the PKI hierarchy is to be deployed;
processing, by a PKI creation service, a plurality of stored PKI information and the plurality of infrastructure information;
determining, based at least in part on the processing of the plurality of stored PKI information and the plurality of infrastructure information, a PKI template defining a first configuration of a first PKI hierarchy, wherein the first configuration specifies at least a first certificate authority (CA) hierarchy;
generating, by the PKI creation service, a first configurable representation of the first configuration of the first PKI hierarchy defined by the PKI template;
sending, for presentation on the client device, the first configurable representation of the first configuration of the first PKI hierarchy;
obtaining, from the client device, an interaction with the first configurable representation of the first PKI hierarchy indicating a modification to the first configuration of the first PKI hierarchy;

generating, by the PKI creation service in response to the interaction, an updated PKI template including the modification to the first configuration of the first PKI hierarchy, the updated PKI template defining a second configuration of a second PKI hierarchy, wherein the second configuration specifies at least a second CA hierarchy;

generating, by the PKI creation service, a second configurable representation of the second configuration of the second PKI hierarchy;

sending, for presentation on the client device, the second configurable representation of the second configuration of the second PKI hierarchy;

obtaining, from the client device, an indication of an acceptance of the second configuration of the second PKI hierarchy; and providing, by the PKI creation service, the second PKI hierarchy as the PKI hierarchy.

2. The computer-implemented method of claim 1, wherein the plurality of infrastructure information includes at least one of:
- a use case associated with the network system;
- a usage model associated with the network system;
- a plurality of end users associated with the network system; or
- a PKI management account.

3. The computer-implemented method of claim 1, wherein providing the second PKI hierarchy as the PKI hierarchy includes at least one of:
- generating first executable program instructions configured to create and deploy the PKI hierarchy upon execution of the executable program instructions; or
- executing second executable program instructions configured to create and deploy the PKI hierarchy upon execution of the second executable program instructions.

4. The computer-implemented method of claim 1, wherein the first configuration includes at least one of:
- a certificate authority role;
- a certificate template;
- a plurality of security configurations;
- a certificate authority lifecycle;
- a certificate lifecycle;
- a certificate distribution configuration;
- a trust store management configuration; or
- a certificate revocation service.

5. A computing system, comprising:
one or more processors; and
a memory storing program instructions that, when executed by the one or more processors, cause the one or more processors to at least:
- process a plurality of infrastructure information and a plurality of stored public key infrastructure (PKI) information to determine a PKI template defining a configuration of a PKI hierarchy, wherein the configuration specifies at least a certificate authority (CA) hierarchy;
- generate a configurable graphical representation of the configuration of the PKI hierarchy;
- send, for presentation on a client device, the configurable graphical representation of the configuration of the PKI hierarchy;
- receive, via an interaction with the configurable graphical representation of the PKI hierarchy on the client device, a modification to the configuration of the PKI hierarchy; and
- update the configuration of the PKI hierarchy to include the modification.

6. The computing system of claim 5, wherein the program instructions, when executed by the one or more processors, further cause the one or more processors to at least:
- generate, for presentation on the client device, a user interface presenting a plurality of requests for infrastructure information; and
- obtain, from the client device, a plurality of responses to the plurality of requests for infrastructure information, wherein the plurality of infrastructure information includes the plurality of responses to the plurality of requests for infrastructure information.

7. The computing system of claim 6, wherein the program instructions, when executed by the one or more processors, further cause the one or more processors to at least:
- send, for presentation on the client device, a first request for infrastructure information from the plurality of requests for infrastructure information, such that the first request for infrastructure information is presented on the client device prior to generation of the configurable graphical representation of the PKI hierarchy;
- obtain, from the client device, a first response to the first request for infrastructure information; and
- dynamically determine, based at least in part on the first response to the first request for infrastructure information, a second request for infrastructure information.

8. The computing system of claim 6, wherein the program instructions, when executed by the one or more processors, further cause the one or more processors to at least:
- send, for presentation on the client device, a first request for infrastructure information from the plurality of requests for infrastructure information, such that the first request for infrastructure information is presented on the client device prior to generation of the configurable graphical representation of the configuration of the PKI hierarchy;
- obtain, from the client device, a first response to the first request for infrastructure information; and
- send, for presentation on the client device, a second request for infrastructure information from the plurality of requests for infrastructure information, such that the second request for infrastructure information is presented on the client device concurrently with a presentation of the configurable graphical representation of the configuration of the PKI hierarchy,
- wherein the PKI template is determined based at least in part on the first response to the first request for infrastructure information.

9. The computing system of claim 8, wherein the program instructions, when executed by the one or more processors, further cause the one or more processors to at least:
- obtain, from the client device, a second response to the second request for infrastructure information;
- update the PKI template, based at least in part on the second response to the second request for infrastructure information, to generate an updated PKI template defining an updated configuration of an updated PKI hierarchy;
- generate an updated configurable graphical representation of the updated PKI hierarchy; and send, for presentation on the client device, the updated configurable graphical representation of the second PKI hierarchy.

10. The computing system of claim 5, wherein the program instructions, when executed by the one or more processors, further cause the one or more processors to at least:
in response to the modification to the configuration of the PKI hierarchy:
determine, based at least in part on the modification to the configuration of the PKI hierarchy, a second modification to the configuration of the PKI hierarchy;
generate, for presentation on the client device, a second configurable graphical representation of the configuration of the PKI hierarchy including the second modification; and
send, for presentation on the client device, the second configurable graphical representation.

11. The computing system of claim 5, wherein the program instructions, when executed by the one or more processors, further cause the one or more processors to at least:
determine an estimated cost associated with the PKI hierarchy; and
send, for presentation on the client device, the estimated cost associated with the PKI hierarchy.

12. The computing system of claim 5, wherein determination of the PKI template is performed using a trained machine learning model.

13. The computing system of claim 5, wherein the plurality of infrastructure information includes at least one of:
a use case associated with a network system for which the PKI hierarchy is intended;
a usage model associated with the network system for which the PKI hierarchy is intended;
a plurality of end users associated with the network system for which the PKI hierarchy is intended; or
a PKI management account for the PKI hierarchy.

14. The computing system of claim 5, wherein the plurality of stored PKI information includes at least one of:
a plurality of best practices information;
a plurality of historical PKI information; or
a plurality of stored PKI templates.

15. The computing system of claim 5, wherein the configuration of the PKI hierarchy includes at least one of:
a certificate authority role;
a certificate template;
a plurality of security configurations;
a certificate authority lifecycle;
a certificate lifecycle;
a certificate distribution configuration;
a trust store management configuration; or
a certificate revocation service.

16. A method to analyze an existing public key infrastructure (PKI) hierarchy, comprising:
obtaining a plurality of PKI hierarchy information associated with the existing PKI hierarchy;
processing the plurality of PKI hierarchy information to determine a configuration of the existing PKI hierarchy, wherein the configuration includes at least a certificate authority (CA) hierarchy;
generating a configurable graphical representation of the configuration of the existing PKI hierarchy;
sending, for presentation on a client device, the configurable graphical representation of the configuration of the existing PKI hierarchy;
receiving, via an interaction with the configurable graphical representation of the existing PKI hierarchy on the client device, a modification to the configuration of the existing PKI hierarchy; and
updating the configuration of the existing PKI hierarchy to include the modification.

17. The method of claim 16, further comprising:
generating, for presentation on the client device, a user interface presenting a plurality of requests for infrastructure information;
obtaining, from the client device, a plurality of responses to the plurality of requests for infrastructure information;
processing the plurality of responses and a plurality of stored PKI information to determine a PKI change template defining a change to the configuration of the existing PKI hierarchy;
generating a second configurable graphical representation of the change to the configuration of the existing PKI hierarchy; and
sending, for presentation on the client device, the second configurable graphical representation.

18. The method of claim 17, further comprising:
receiving, via a second interaction with the second configurable graphical representation, an indication of acceptance of the change to the configuration of the existing PKI hierarchy.

19. The method of claim 17, further comprising:
receiving, via a second interaction with the second configurable graphical representation, an indication of a second modification to the change to the configuration of the existing PKI hierarchy defined by the PKI change template; and
updating the configuration of the existing PKI hierarchy to include the second modification.

20. The method of claim 16, further comprising:
in response to the modification to the configuration of the existing PKI hierarchy:
determining, based at least in part on the modification to the configuration of the existing PKI hierarchy, a second modification to the configuration of the PKI hierarchy;
generating, for presentation on the client device, a second configurable graphical representation of the configuration of the existing PKI hierarchy including the second modification; and
sending, for presentation on the client device, the second configurable graphical representation.

* * * * *